United States Patent [19]

Iwasaki et al.

[11] Patent Number: 5,081,350
[45] Date of Patent: Jan. 14, 1992

[54] SCANNING MICROSCOPE AND SCANNING MECHANISM FOR THE SAME

[75] Inventors: Osamu Iwasaki; Koji Yoshida, both of Kanagawa, Japan

[73] Assignee: Fuji Photo Film Co., Ltd., Kanagawa, Japan

[21] Appl. No.: 587,122

[22] Filed: Sep. 24, 1990

[30] Foreign Application Priority Data

| Sep. 22, 1989 | [JP] | Japan | 1-246946 |
| Nov. 29, 1989 | [JP] | Japan | 1-309498 |
| Feb. 13, 1990 | [JP] | Japan | 2-31778 |
| Feb. 13, 1990 | [JP] | Japan | 2-31779 |
| Apr. 10, 1990 | [JP] | Japan | 2-94654 |
| Jun. 1, 1990 | [JP] | Japan | 2-143544 |

[51] Int. Cl.$^5$ .......................... H01J 3/14; H01J 5/16; H01J 40/14
[52] U.S. Cl. ........................... 250/234; 359/368
[58] Field of Search ............... 250/216, 234, 235, 236; 350/507, 508, 414; 356/349, 359, 360, 244

[56] References Cited

U.S. PATENT DOCUMENTS

| 4,863,226 | 9/1989 | Houpt et al. | 250/566 |
| 4,893,008 | 1/1990 | Horikawa | 250/234 |
| 4,897,537 | 1/1990 | Miyamoto et al. | 350/507 |
| 5,032,720 | 7/1991 | White | 350/507 |
| 5,035,476 | 7/1991 | Ellis et al. | 350/507 |

FOREIGN PATENT DOCUMENTS 62-217218 9/1987 Japan.

Primary Examiner—David C. Nelms
Assistant Examiner—S. Allen
Attorney, Agent, or Firm—Sughrue, Mion, Zinn, Macpeak & Seas

[57] ABSTRACT

A confocal scanning microscope comprises a sample supporting member on which a sample is supported, and a light source which produces a light beam. A light projecting device forms an image of the light beam as a small light spot on the sample. A light receiving device condenses the light beam, which has been radiated out of the sample, and forms an image of the condensed light beam as a point image. A photodetector detects the point image. A movable member supports the light projecting device and the light receiving device. A main scanning device reciprocally moves the movable member such that the light spot scans the sample in main scanning directions. A sub-scanning device moves the sample supporting member with respect to the movable member in sub-scanning directions, which are normal to the main scanning directions, and at a speed lower than the speed at which the light spot scans the sample in the main scanning directions, whereby the sample is scanned with the light spot in the sub-scanning directions.

21 Claims, 19 Drawing Sheets

F I G. 13
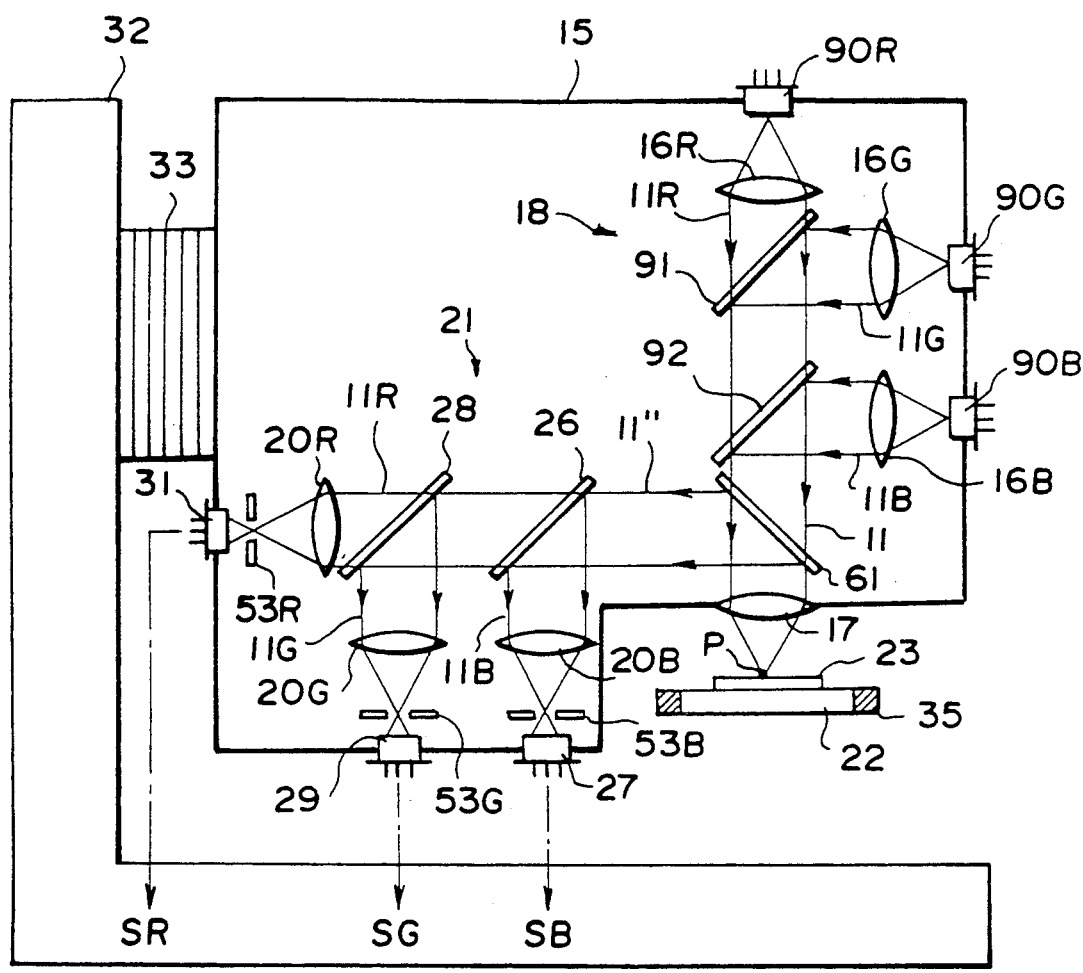

5,081,350

SCANNING MICROSCOPE AND SCANNING MECHANISM FOR THE SAME

BACKGROUND OF THE INVENTION

1. Field of the Invention

This invention relates to a scanning microscope. This invention particularly relates to a scanning microscope provided with an improved mechanism for scanning a sample with a light spot. This invention also relates to a novel scanning mechanism for use in a scanning microscope.

2. Description of the Prior Art

Optical type scanning microscopes have heretofore been used. With the scanning microscope, a light beam is converged to a small light spot on a sample, and the sample is two-dimensionally scanned with the light spot. The light beam, which has passed through the sample during the scanning, the light beam, which has been reflected from the sample during the scanning, or the fluorescence, which is produced by the sample during the scanning, is detected by a photodetector. An enlarged image of the sample is thereby obtained.

As one type of the scanning microscopes, a confocal scanning microscope has heretofore been proposed. With the confocal scanning microscope, a light beam is produced by a light source and is condensed to a light spot such that an image of the light spot is formed on a sample. Also, a point image of the light beam, which has been radiated out of the sample, is formed and detected by a photodetector. The confocal scanning microscope is advantageous in that no pinhole need be located o the surface of the sample.

Basically, the confocal scanning microscope comprises:

i) a light source which produces a light beam,
ii) a sample supporting member on which a sample is supported,
iii) a light projecting optical means with which an image of the light beam is formed as a small light spot on the sample,
iv) a light receiving optical means with which the light beam radiated out of the sample (i.e. the light beam, which has passed through the sample, the light beam, which has been reflected from the sample, or the fluorescence produced by the sample) is condensed, and an image of the
v) a photodetector which detects the point image, and
vi) scanning mechanism for two-dimensionally scanning the sample with the light spot.

An example of the confocal scanning microscope is disclosed in Japanese Unexamined Patent Publication No. 62(1987)-217218.

The conventional confocal scanning microscope utilizes one of the following scanning mechanisms:

(1) a mechanism which two-dimensionally moves the sample supporting member, and
(2) a mechanism which two-dimensionally deflects the light beam by a light deflector.

However, the scanning mechanism described in (1) has the problem in that the sample flies out of its correct position when it is scanned quickly. With scanning microscopes, samples of living organisms are often observed. If the quick scanning cannot be carried out during the observation of a sample of a living organism, subtle movements of the sample cannot be found. Also, a need exists widely for the real-time recording of images of various other samples. If the quick scanning cannot be carried out, such a requirement cannot be satisfied.

With the scanning mechanism described in (2), quick scanning can be achieved. However, the scanning mechanism has the drawback in that a light deflector, such as a galvanometer mirror or an acousto-optic light deflector (AOD), which is expensive must be used. Also, with the scanning mechanism described in (2), a light beam is deflected by a light deflector. As a result, the angle of incidence of the deflected light beam upon an objective lens of the light projecting optical means changes momentarily, and aberration is caused to occur. Therefore, the scanning mechanism described in (2) also has the problem in that it is difficult for the objective lens to be designed such that aberration can be eliminated. Particularly, in cases where an AOD is utilized, astigmatism occurs in the light beam radiated out of the AOD. Therefore, in such cases, a special correction lens must be used, and the optical means cannot be kept simple.

SUMMARY OF THE INVENTION

The primary object of the present invention is to provide a confocal scanning microscope which enables quick scanning, which is simple, and which can be manufactured at a low cost.

Another object of the present invention is to provide a confocal scanning microscope wherein a light beam coming from a light receiving optical means is guided through an optical fiber to a photodetector, and wherein a pinhole can be located easily together with an edge surface of the optical fiber at the position where an image of the light beam coming from the light receiving optical means is formed.

A further object of the present invention is to provide a confocal scanning mechanism which is suitable for use in the confocal scanning microscope.

A still further object of the present invention is to provide a scanning microscope wherein a movable member carrying the optical means or a sample supporting member can be moved quickly, and therefore a sample can be quickly scanned with a light beam.

The specific object of the present invention is to provide a scanning mechanism which is suitable for use in the scanning microscope.

The present invention provides a first confocal scanning microscope comprising:

i) a sample supporting member on which a sample is supported,
ii) a light source which produces a light beam,
iii) a light projecting optical means with which an image of said light beam is formed as a small light spot on said sample,
iv) a light receiving optical means with which the light beam radiated out of said sample is condensed, and an image of the condensed light beam is formed as a point image,
v) a photodetector which detects said point image,
vi) a movable member which supports said light projecting optical means and said light receiving optical means together,
vii) a main scanning means which reciprocally moves said movable member such that said light spot scans said sample in main scanning directions, and
viii) a sub-scanning means which moves said sample supporting member with respect to said movable member in sub-scanning directions, which are approximately normal to said main scanning directions, and at a speed lower than the speed at which said light spot scans said sample in said main scanning directions, whereby said sample is scanned with said light spot in said sub-scanning directions.

As will be understood from the specification, it should be noted that the term "moving a sample supporting member with respect to a movable member in sub-scanning directions" as used herein means movement of the sample supporting member relative to the movable member in the sub-scanning directions, and embraces both the cases wherein the sample supporting member is moved while the movable member is kept stationary with respect to the sub-scanning directions, and cases wherein the movable member is moved in the sub-scanning directions while the sample supporting member is kept stationary.

The speed, at which the sample is scanned with the light spot in the sub-scanning directions, can be kept comparatively low. Therefore, even when the sample supporting member is moved in the sub-scanning direction in the manner described above, the sample does not fly out of its correct position.

With the first confocal scanning microscope in accordance with the present invention, the light beam is not deflected during the scanning. Therefore, only the light beam on the optical axis of the optical means need be taken into consideration during the designing of the optical means. Accordingly, the optical means can be designed easily.

With the first confocal scanning microscope in accordance with the present invention, the light projecting optical means and the light receiving optical means are supported together by the movable member, and the main scanning of the light spot is carried out by reciprocally moving the movable member. Therefore, the sample supporting member need not be moved quickly, and the sample is prevented from flying out of its correct position. Also, the quick scanning can be achieved.

Also, as described above, with the first confocal scanning microscope in accordance with the present invention, the light beam is not deflected during the scanning, and therefore the optical means can be designed easily. Additionally, no expensive light deflector, such as a galvanometer mirror or an AOD, need be used, and the configuration of the confocal scanning microscope can be kept simple. Therefore, the first confocal scanning microscope in accordance with the present invention can be manufactured at a lower cost than the conventional confocal scanning microscope.

The present invention also provides a second confocal scanning microscope comprising:

i) a sample supporting member on which a sample is supported, ii) a light source which produces a light beam, iii) a light projecting optical means with which an image of said light beam is formed as a small light spot on said sample, iv) a light receiving optical means with which the light beam radiated out of said sample is condensed, and an image of the condensed light beam is formed as a point image, v) a photodetector which detects said point image, vi) a scanning means which moves said light projecting optical means and said light receiving optical means in synchronization with each other with respect to said sample supporting member such that said light spot scans said sample in main scanning directions and sub-scanning directions, and vii) an optical fiber having a first edge surface, on which an image of the light beam coming from said light receiving optical means is formed, and a second edge surface from which the light beam, which has entered said optical fiber from said first edge surface, is radiated to said photodetector, wherein a pinhole is formed in a core part at said first edge surface of said optical fiber, and the image of the light beam coming from said light receiving optical means is formed at the position at which said pinhole is formed.

Specifically, the pinhole, through which a light beam can pass, is formed over the whole area or part of the whole area of the core part at the first edge surface of the optical fiber. Therefore, the first edge surface of the optical fiber can serve as a pinhole plate.

With the second confocal scanning microscope in accordance with the present invention, the optical fiber, which guides the light beam to the photodetector, also serves as a pinhole plate. Therefore, a particular pinhole plate, which is independent from the optical fiber, need not be located at the position, at which the image of the light beam coming from the light receiving optical means is formed. Accordingly, the second confocal scanning microscope in accordance with the present invention can be manufactured easily and at a low cost.

The present invention further provides a third scanning microscope comprising:

i) a sample supporting member on which a sample is supported, ii) an optical means which irradiates a light beam to said sample, and iii) a scanning means which moves said optical means with respect to said sample supporting member such that said light beam scans said sample, wherein the improvement comprises the provision of a mechanism for keeping a member (for example, a movable member on which the optical means is supported), which is moved during said scanning, and a guide member, which supports and guides said member, such that they are not in contact with each other.

By way of example, the mechanism for keeping the member, which is moved during the scanning, and the guide member such that they are not in contact with each other jets a gas to the region between them.

Alternatively, the mechanism for keeping the member, which is moved during the scanning, and the guide member such that they are not in contact with each other causes them to repulse each other by magnetic force.

As will be understood from the specification, it should be noted that the term "moving an optical means with respect to a sample supporting member" as used herein means movement of the optical means relative to the sample supporting member, and embraces the cases wherein the optical means is moved while the sample supporting member is kept stationary, cases wherein the sample supporting member is moved while the optical means is kept stationary, and cases wherein both the optical means and the sample supporting member are moved.

With the third scanning microscope in accordance with the present invention, a gas is jetted to the region between the member, which is moved during the scanning with a light spot, and a guide member, which supports and guides said member, such that they are not in contact with each other. Alternatively, they are caused to repulse each other by magnetic force such that they are not in contact with each other. Therefore, the member, which is moved during the scanning with a light spot, can move in a slightly spaced relation to the guide member. Accordingly, the frictional resistance against the member, which is moved during the scanning with a light spot, can be kept small, and the load to a source for operating said member can be kept low.

As a result, with the third scanning microscope in accordance with the present invention, a device, such as a piezo-electric device or an ultrasonic vibrator, which has a small operating force but is capable of quickly operating, can be utilized as the source for operating said member. Therefore, the quick scanning can be achieved. Accordingly, with the third scanning microscope in accordance with the present invention, the time required for microscope images to be picked up can be kept markedly short.

Also, with the third scanning microscope in accordance with the present invention, the member, which is moved during the scanning with a light spot, can move in a slightly spaced relation to the guide member. Therefore, vibration which occurs during the movement of said member can be kept small, the accuracy with which the sample is scanned can be kept high, and the quality of microscope images can be kept good. Additionally, heat is prevented from being generated due to friction between the member, which is moved during the scanning with a light spot, and the guide member. Therefore, the scanning mechanism can be prevented from deforming due to frictional heat and from being abraded. Accordingly, the reliability and the durability of the scanning microscope can be kept good.

The present invention still further provides a confocal scanning mechanism comprising:
  i) a material supporting member on which a material to be scanned is supported,
  ii) a light source which produces a light beam,
  iii) a light projecting optical means with which an image of said light beam is formed as a small light spot on said material to be scanned,
  iv) a light receiving optical means with which the light beam radiated out of said material to be scanned is condensed, and an image of the condensed light beam is formed as a point image,
  v) a photodetector which detects said point image,
  vi) a movable member which supports said light projecting optical means and said light receiving optical means together,
  vii) a main scanning means which reciprocally moves said movable member such that said light spot scans said material, which is to be scanned, in main scanning directions, and
  viii) a sub-scanning means which moves said material supporting member with respect to said movable member in sub-scanning directions, which are approximately normal to said main scanning directions, whereby said material to be scanned is scanned with said light spot in said sub-scanning directions.

The present invention also provides a scanning mechanism comprising:
  i) a material supporting member on which a material to be scanned is supported,
  ii) an optical means which irradiates a light beam to said material to be scanned, and
  iii) a scanning means which moves said optical means with respect to said material supporting member such that said light beam scans said material to be scanned,
wherein the improvement comprises the provision of a mechanism for keeping a member, which is moved during said scanning, and a guide member, which supports and guides said member, such that they are not in contact with each other.

DESCRIPTION OF THE PREFERRED EMBODIMENTS

The present invention will hereinbelow be described in further detail with reference to the accompanying drawings.

Figure 1:
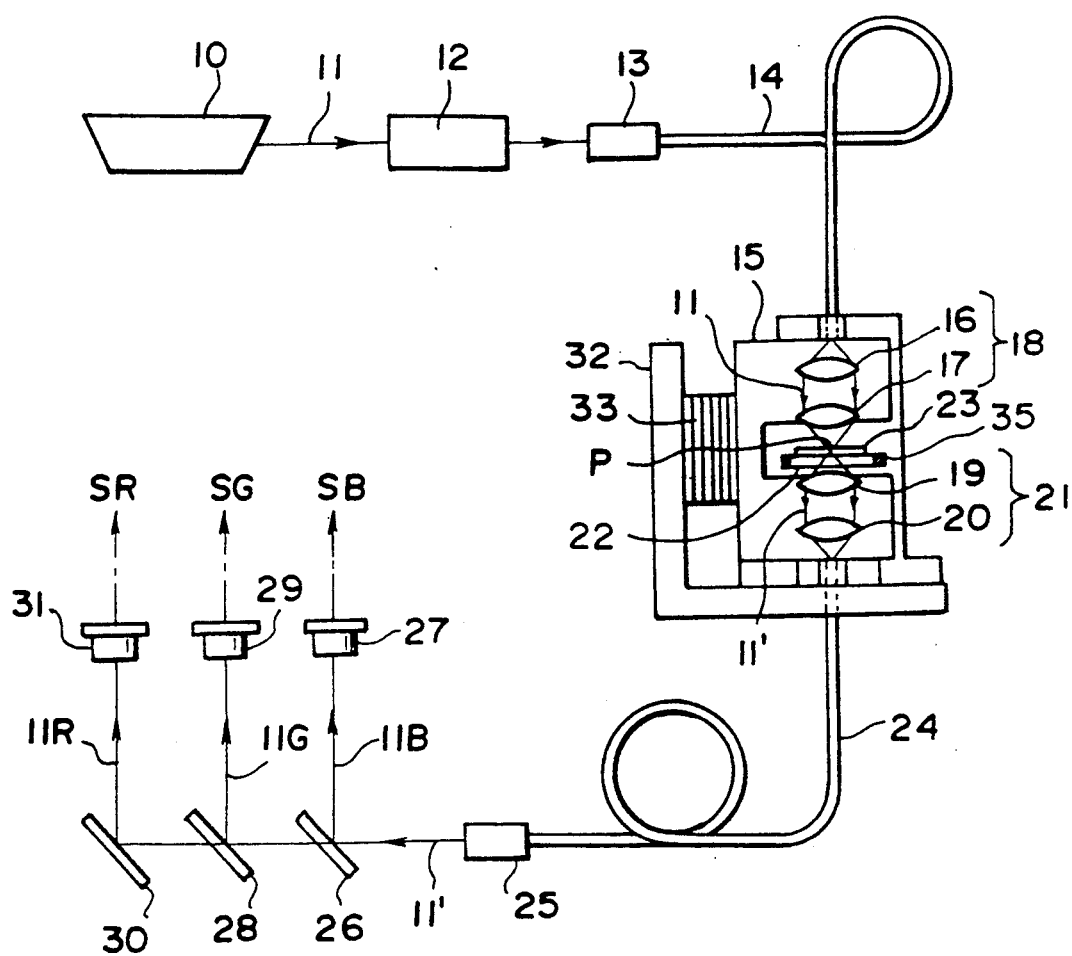
FIG. 1 is a schematic front view showing a first embodiment of the first confocal scanning microscope in accordance with the present invention.
Figure 2:
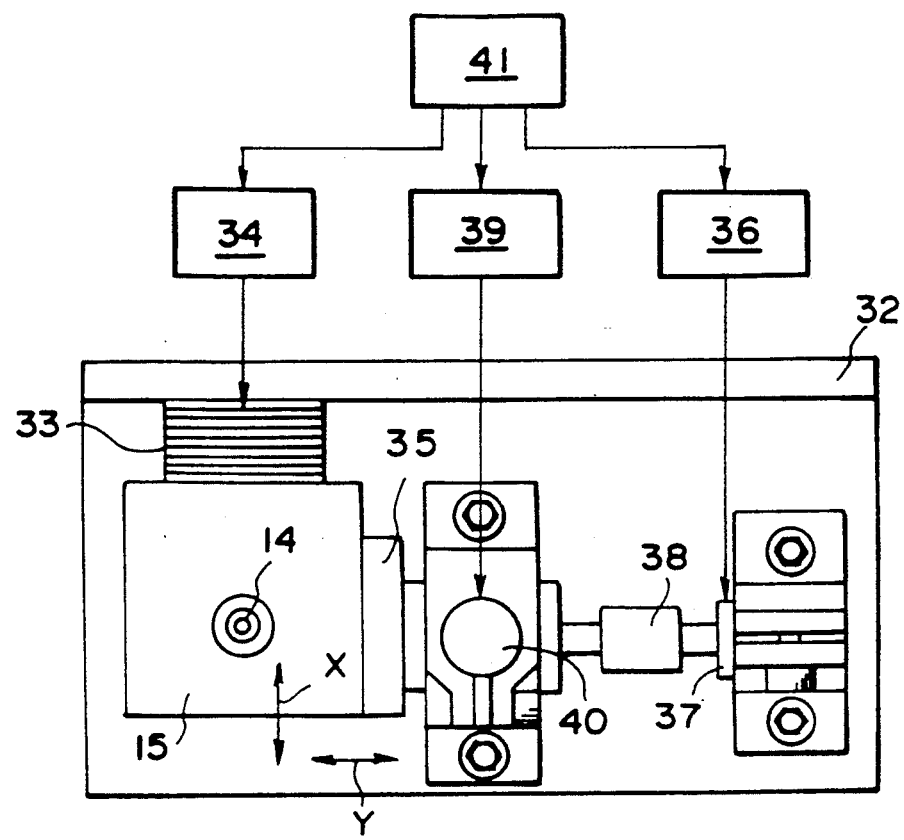
FIG. 2 is a plan view showing the major part of the embodiment shown in FIG. 1.
Figure 3:
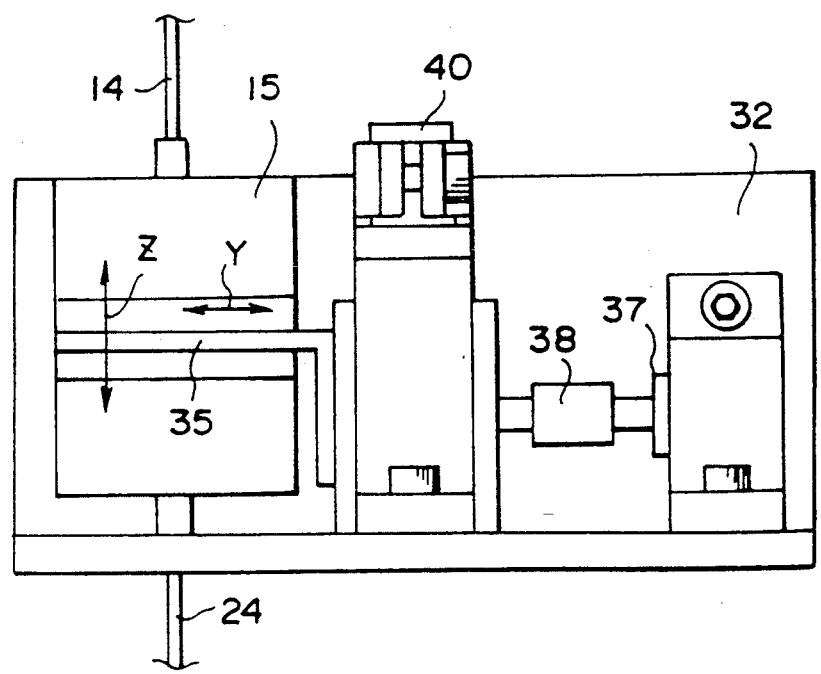
FIG. 3 is a side view showing the major part of the embodiment shown in FIG. 1.

FIG. 1 shows a first embodiment of the first confocal scanning microscope in accordance with the present invention, which is of the transmission type. FIGS. 2 and 3 show a scanning mechanism employed in this embodiment. As illustrated in FIG. 1, an RGB laser 10 produces a laser beam 11 composed of red light, green light, and blue light. A beam compressor 12 reduces the beam diameter of the laser beam 11. The laser beam 11 then condensed by a distributed index lens 13 and impinges upon a single-mode optical fiber 14.

One edge of the optical fiber 14 is secured to a movable member 15. The laser beam 11, which has been guided through the optical fiber 14, is radiated out of the edge of the optical fiber 14, which is secured to the movable member 15. At this time, the edge of the optical fiber 14 radiates the laser beam 11 like a point light source. A light projecting optical means 18 and a light receiving optical means 21 are secured to the movable member 15 such that their optical axes align with each other. The light projecting optical means 18 is composed of a collimator lens 16 and an objective lens 17. The light receiving optical means 21 is composed of an objective lens 19 and a condensing lens 20. Also, a sample supporting member 22, which is independent from the movable member 15, is located between the light projecting optical means 18 and the light receiving optical means 21.

The laser beam 11 is collimated by the collimator lens 16, and the collimated laser beam 11 is then condensed by the objective lens 17. In this manner, an image of the condensed laser beam 11 is formed as a small light spot at a point P on a sample 23, which is placed on the sample supporting member 22. A laser beam 11', which has passed through the sample 23, is collimated by the objective lens 19 of the light receiving optical means 21, and the collimated laser beam 11' is then condensed by the condensing lens 20. Thereafter, the condensed laser beam 11' impinges upon one edge of a single-mode optical fiber 24 and enters the optical fiber 24. The edge of the optical fiber 24 is secured to the movable member 15, and the other edge thereof is connected to a distributed index lens 25. The laser beam 11', which has been guided through the optical fiber 24, is radiated out of the other edge of the optical fiber 24 and is collimated by the distributed index lens 25.

The laser beam 11', which has been collimated by the distributed index lens 25, impinges upon a dichroic mirror 26. Only the blue light 11B is reflected by the dichroic mirror 26 and detected by a first photodetector 27. The laser beam 11', which has passed through the dichroic mirror 26, impinges upon a dichroic mirror 28. Only the green light 11G is reflected by the dichroic mirror 28. The green light 11G is detected by a second photodetector 29. The laser beam 11' (i.e. the red light 11R), which has passed through the dichroic mirror 28, is reflected by a mirror 30 and detected by a third photodetector 31. The photodetectors 27, 29, and 31 are constituted of photodiodes, or the like, and generate signals SB, SG, and SR, which represent the blue components, the green components, and the red components of an enlarged image of the sample 23.

How the sample 23 is two-dimensionally scanned with the light spot of the laser beam 11, which is formed at the point P, will be described hereinbelow with reference to FIGS. 2 and 3. FIG. 2 is a plan view showing the movable member 15 and the surrounding parts shown in FIG. 1. FIG. 3 is a right side view showing the movable member 15 and the surrounding parts shown in FIG. 1. The movable member 15 is secured to a laminated piezo-electric device 33, which is in turn secured to a frame 32. The laminated piezo-electric device 33 receives operating electric power from a piezo-electric device operating circuit 34 and reciprocally moves the movable member 15 at high speeds in the main scanning directions indicated by the double headed arrow X. By way of example, the frequency of the reciprocal movement is set as being 10 kHz. In such cases, if the main scanning width is equal to 100 μm, the main scanning speed will be equal to $$10 \times 10^3 \times 100 \times 10^{-6} \times 2 = 2 m/s$$

The optical fibers 14 and 24 are flexible and allow the movable member 15 to move while the laser beam 11 and the laser beam 11' are guided therethrough.

The sample supporting member 22 is secured to a two-dimensionally movable stage 35. The two-dimensionally movable stage 35 is connected to a micrometer 38, which is in turn connected to a pulse motor 37. The pulse motor 37 receives an operating current from a motor operating circuit 36. The two-dimensionally movable stage 35 is reciprocally moved by the pulse motor 37 in the sub-scanning directions indicated by the double headed arrow Y. In this manner, the sample supporting member 22 is moved with respect to the movable member 15, and the sample 23 is scanned with the light spot, which is formed at the point P, in the sub-scanning directions indicated by the double headed arrow Y. The sub-scanning directions are normal to the main scanning directions indicated by the double headed arrow X. By way of example, the time required for the sub-scanning is set as being 1/20 second. In such cases, if the sub-scanning width is equal to 100 μm, the sub-scanning sped will be equal to $$20 \times 100 \times 10^{-6} = 0.002 m/s = 2 mm/s$$

Specifically, the sub-scanning speed is sufficiently lower than the main scanning speed. When the sub-scanning speed is as low as this level, the sample 23 does not fly out of its correct position when the sample supporting member 22 is moved.

In the manner described above, the sample 23 is two-dimensionally scanned with a light spot formed at the point P. As a result, the time-serial signals SB, SG, and SR representing the two-dimensional image of the sample 2 are obtained. By way of example, the signals SB, SG, and SR are integrated with a predetermined period, and signals divided into picture elements are obtained.

In this embodiment, the two-dimensionally movable stage 35 is also moved by a pulse motor 40 in the directions indicated by the double headed arrow Z (i.e. along the optical axis of the light projecting optical means 18 and the light receiving optical means 21), which directions are normal to the main scanning directions indicated by the double headed arrow X and the sub-scanning directions indicated by the double headed arrow Y. For this purpose, a motor operating circuit 39 feeds an operating current to the pulse motor 40. The two-dimensional scanning with the light spot formed at the point P is carried out each time the two-dimensionally movable stage 35 is moved a predetermined distance along the directions indicated by the double headed arrow Z. In this manner, only the information at the focusing plane can be detected by the photodetectors 27, 29, and 31. The signals SB, SG, and SR generated by the photodetectors 27, 29, and 31 may be stored on a frame memory. In this manner, signals can be obtained which represent the image information at every focusing plane within the range of movement of the sample 23 along the directions indicated by the double headed arrow Z.

A control circuit 41 feeds synchronizing signals to the piezo-electric device operating circuit 34 and the motor operating circuits 36, 39. The synchronizing signals synchronize the scanning with the light spot, which is formed at the point P, in the main and sub-scanning directions, and the movement of the sample supporting member 22 in the directions indicated by the double headed arrow Z with each other.

The embodiment described above may be modified in various ways. For example, in the aforesaid embodiment, after the beam diameter of the laser beam 11 is reduced by the beam compressor 12, the laser beam 11 is condensed by the distributed index lens 13 and enters the single-mode optical fiber 14. A microscope objective lens, or the like, may be employed in lieu of the distributed index lens 13. Also, a multi-mode optical fiber provided with a pinhole, or the like, may be employed in lieu of the single-mode optical fiber 14.

Also, a microscope objective lens, or the like, may be employed in lieu of the distributed index lens 25, which serves as a condensing element on the side of the light receiving optical means 21. A d.c. motor provided with an encoder may be employed in lieu of the pulse motor 37, which reciprocally moves the sample supporting member 22 secured to the two-dimensionally movable stage 35 in the sub-scanning directions indicated by the double headed arrow Y. Instead of the sub-scanning with the light spot, which is formed at the point P, being carried out by the movement of the sample supporting member 22, the sub-scanning with the light spot may be effected by moving the movable member 15. Additionally, instead of the laminated piezo-electric device 33 being used to move the movable member 15, a scanning technique utilizing a voice coil and natural oscillation of a solid with ultrasonic waves, or the like, may be utilized to move the movable member 15.

Figure 4:
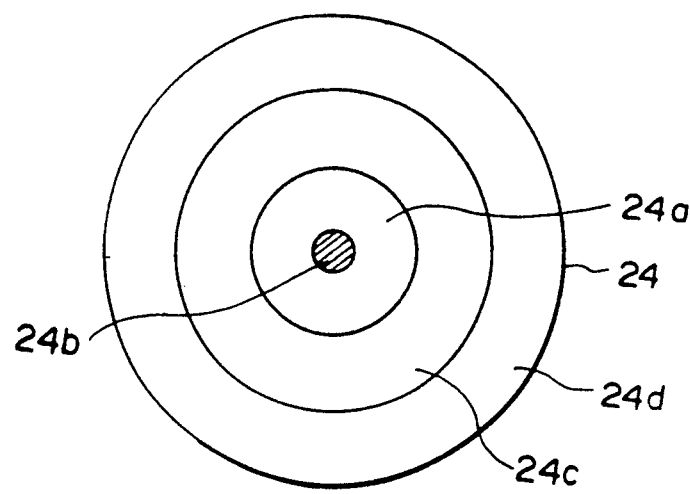
FIG. 4 is a schematic view showing an edge surface of an optical fiber, which may be employed in the embodiment of FIG. 1, FIGS. 5, 6, 7, 8, 9, 10, 11, 12, 13, and 14 are schematic front views showing second, third, fourth, fifth, sixth, seventh, eighth, ninth, tenth, and eleventh embodiments of the first confocal scanning microscope in accordance with the present invention.

FIG. 4 is a schematic view showing an edge surface of an optical fiber, which should preferably be employed as the optical fiber 24 in the embodiment of FIG. 1. As described above, the laser beam 11', which has been condensed by the condensing lens 20 shown in FIG. 1, impinges upon one edge of the optical fiber 24. A pinhole 24b, through which the laser beam 11' can pass, is formed in a core part 24a at said edge of the optical fiber 24. The pinhole 24b is located at the position at which an image of the light spot of the laser beam 11' condensed by the condensing lens 20 shown in FIG. 1 is formed.

Specifically, the optical fiber 24 is composed of the core part 24a, a cladding layer 24c, and a jacket layer 24d. The pinhole 24b is formed approximately at the center part of the edge surface of the core part 24a. The pinhole 24b is formed from a process wherein an aluminum layer is deposited by vacuum evaporation on the areas of the core part 24a and the cladding layer 24c in the edge surface of the optical fiber 24, upon which edge surface the laser beam 11' condensed by the condensing lens 20 impinges, and only the part of the aluminum layer corresponding to the center part of the core part 24a is then removed by an etching technique. The diameter of the optical fiber 24 is approximately 125 $\mu$m, and the diameter of the core part 24a falls within the range of approximately 3 $\mu$m to approximately 10 $\mu$m. The diameter of the pinhole 24b is smaller than the diameter of the core part 24a and is, for example, approximately 1 $\mu$m. In general, it is difficult for the diameters of core parts of the single-mode optical fibers to be made very small, and therefore the core parts have comparatively large diameters. In such cases, if a pinhole is formed over the whole area of the edge surface of the core part, a microscope image having good image quality cannot be obtained. In the embodiment described above, the aluminum layer is deposited by vacuum evaporation on the edge surface of the optical fiber 24, and the desired part of the aluminum layer is removed by the etching technique. Therefore, a pinhole having a desirable diameter smaller than the diameter of the core part 24a can be formed. Accordingly, a microscope image having good image quality, e.g. good resolution and contrast, can be obtained.

The optical fiber 24 shown in FIG. 4 may be modified in various ways. For example, instead of the aluminum layer be deposited, a layer of any of other metals may be deposited by vacuum evaporation on the edge surface of the optical fiber 24. Also, the pinhole 24b need not necessarily be formed at the center part of the edge surface of the core part 24a, but may be formed at any position in the edge surface of the core part 24a. Therefore, a high accuracy is not required for the position at which the pinhole 24b is formed, and the pinhole 24b can be formed easily. Additionally, instead of the single-mode optical fiber being used as the optical fiber 24, a multi-mode optical fiber may be employed as the optical fiber 24. The multi-mode optical fiber is less expensive than the single-mode optical fiber. Therefore, when the multi-mode optical fiber is employed as the optical fiber 24, the manufacturing cost can be kept low.

In the embodiment described above, the optical fiber 24 shown in FIG. 4 is applied to the confocal scanning microscope, which is of the transmission type. The optical fiber 24 shown in FIG. 4 is also applicable to a confocal scanning microscope which is of the reflection type. Additionally, the optical fiber 24 shown in FIG. 4 is applicable when the movable member 15 or the sample supporting member 22 is moved in the directions indicated by the double headed arrows X and Y, and the main scanning and the sub-scanning are thereby carried out.

Figure 5:
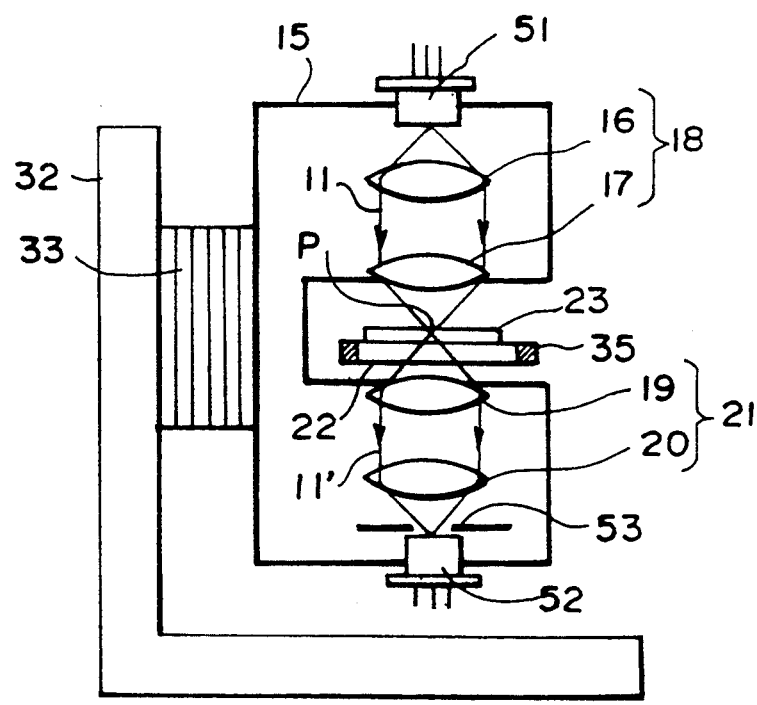

FIG. 5 shows a second embodiment of the first confocal scanning microscope in accordance with the present invention, which is of the monochromatic transmission type. In this embodiment, a light projecting optical means, a light receiving optical means, a light source, and a photodetector are supported together on a movable member. Therefore, the optical means can be kept simple, and the confocal scanning microscope can be kept small in size. In FIG. 5, similar elements are numbered with the same reference numerals with respect to FIGS. 1, 2, and 3.

With reference to FIG. 5, a laser diode 51 is employed as the laser beam source for producing the laser beam 11. The laser diode 51 is supported on the movable member 15. The laser beam 11 produced by the laser diode 51 directly impinges upon the light projecting optical means 18, which is supported on the movable member 15. The light projecting optical means 18 forms an image of the laser beam 11 as a small light spot at the point P on the sample 23. The laser beam 11', which has passed through the sample 23, is condensed by the light receiving optical means 21, which is supported on the movable member 15. The condensed laser beam 11' passes through an aperture pinhole 53 and then directly impinges upon a photodetector 52, which is supported on the movable member 15. In this manner, an image of the condensed laser beam 11' is formed at the photodetector 52. In this embodiment, the two-dimensional scanning with the light spot formed at the point P is carried out in the same manner as that described above for the first embodiment. The output of the photodetector 52 is stored in a frame memory. In this manner, a signal can be obtained which represents the image information at every focusing plane within the range of movement of the sample 23 along the directions indicated by the double headed arrow Z, which is shown in FIG. 3.

Figure 6:
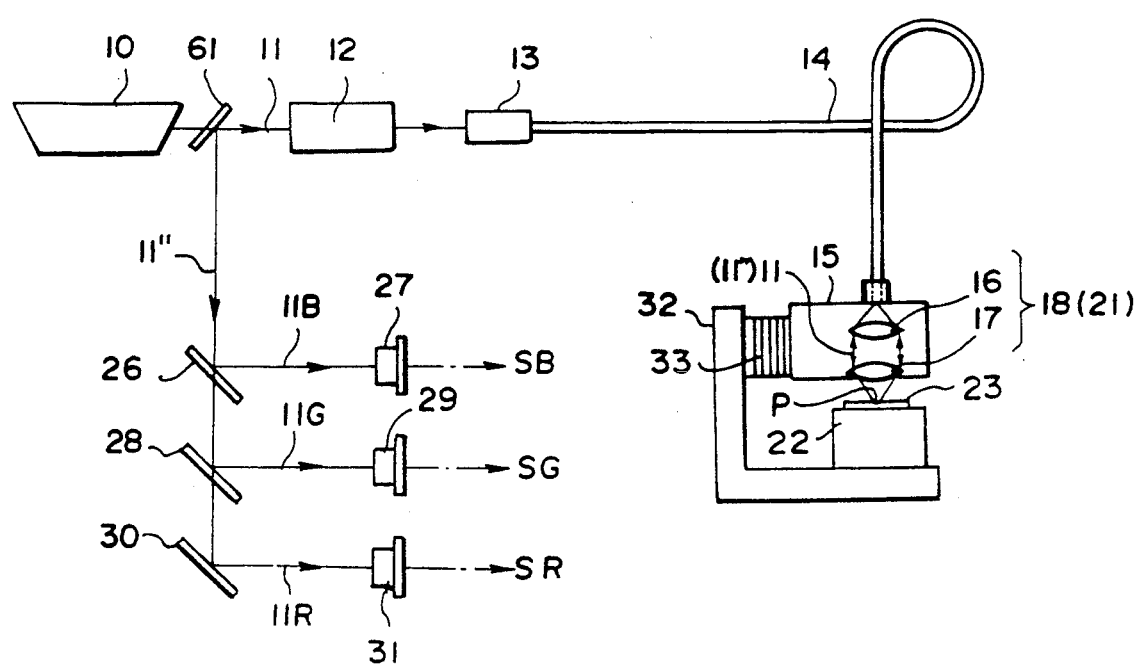

FIG. 6 shows a third embodiment of the first confocal scanning microscope in accordance with the present invention. This embodiment is of the reflection type, wherein a light projecting optical means also serves as a light receiving optical means. In FIG. 6, similar elements are numbered with the same reference numerals with respect to FIGS. 1, 2, and 3. (This also applies to the drawings described later.)

With reference to FIG. 6, in the same manner as that described above for the first embodiment, the laser beam 11 produced by the RGB laser 10 passes through the beam compressor 12, the distributed index lens 13, the single-mode optical fiber 14, and the light projecting optical means 18. An image of a small light spot is thereby formed at the point P on the sample 23. The laser beam 11", which has been reflected by the sample 23, is collimated by the objective lens 17 of the light projecting optical means 18, which also serves as the light receiving optical means 21 described above. Thereafter, the collimated laser beam 11" is condensed by the collimator lens 16, and the condensed laser beam 11" is guided back through the single-mode optical fiber 14. The laser beam 11", which has been guided back through the optical fiber 14, passes through the distributed index lens 13 and the beam compressor 12 and impinges upon beam splitter 61. The laser beam 11" is reflected by the beam splitter 61 and then impinges upon a dichroic mirror 26. Only the blue light 11B is reflected by the dichroic mirror 26 and detected by the first photodetector 27. Thereafter, in the same manner as that described above for the first embodiment, the green light 11G and the red light 11R are detected by the second photodetector 29 and the third photodetector 31. The signals SB, SG, and SR generated by the photodetectors 27, 29, and 31 are stored on a frame memory. In this manner, signals can be obtained which represent the image information at every focusing plane within the range of movement of the sample 23 along the directions indicated by the double headed arrow Z, which is shown in FIG. 3.

Figure 7:
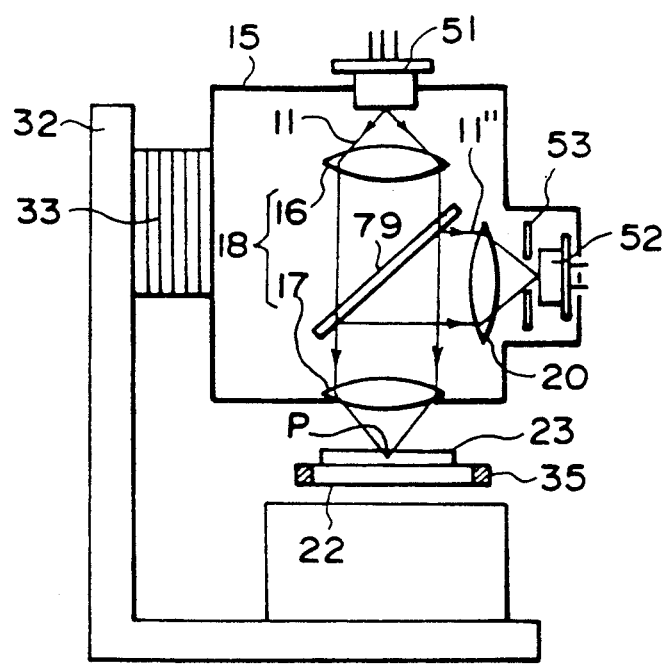

FIG. 7 shows a fourth embodiment of the first confocal scanning microscope in accordance with the present invention, which is of the monochromatic reflection type. In this embodiment, like the second embodiment shown in FIG. 5, the optical means 18, the light source (the laser diode 51), and the photodetector 52 are supported together on the movable member 15.

In this reflection type confocal scanning microscope, the light projecting optical means 18, which is employed in the second embodiment shown in FIG. 5, also serves as the light receiving optical means 21 described above. Also, a semi-transparent mirror 79 is located in the optical means 18. The laser beam 11", which has been reflected by the sample 23, is reflected by the semi-transparent mirror 79 and thereby separated from the laser beam 11. The laser beam 11", which has been reflected by the semi-transparent mirror 79, passes through the condensing lens 20 and the aperture pinhole 53, and is detected by the photodetector 52.

A fifth embodiment of the first confocal scanning microscope in accordance with the present invention, which is constituted as a transmission type fluorescence microscope, will be described hereinbelow with reference to FIG. 8. The major part of this scanning fluorescence microscope is constituted in the same manner as that in the first embodiment shown in FIG. 1. In this embodiment, an Ar laser 70 is employed as the laser beam source. A laser beam 71 having a wavelength of, for example, 488nm or 514.5nm is produced by the Ar laser 70. A sample 72 of a living organism is two-dimensionally scanned with the laser beam 71. Basically, the same scanning mechanism as that in the embodiment of FIG. 1 is employed.

Figure 8:
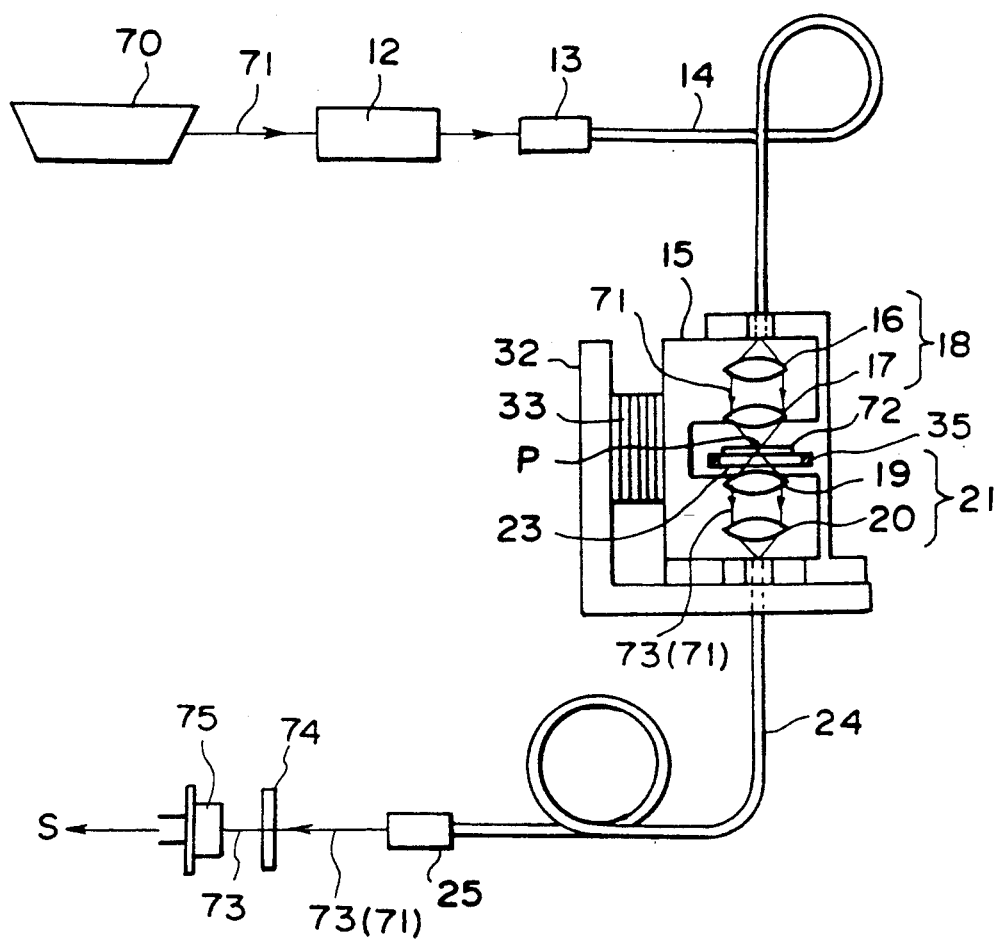

With reference to FIG. 8, a fluorescent probe, such as Fluoroscein isothiocyanate (FITC), Texas Red, or Acridine Orange, has been injected into cells of the living organism sample 72. When such a fluorescent probe is exposed to the laser beam 71, it produces the fluorescence 73 having intrinsic wavelengths. The fluorescence 73 and the laser beam 71 pass through the sample 72, are condensed by the light receiving optical means 21, and then enter the optical fiber 24. The fluorescence 73 and the laser beam 71 are guided through the optical fiber 24 and radiated out of the distributed index lens 25. The fluorescence 73 and the laser beam 71, which have been radiated out of the distributed index lens 25, impinge upon an interference filter 74. The interference filter 74 filters out the laser beam 71, and only the fluorescence 73 is detected by a photodetector 75.

With the scanning fluorescence microscope, the sample 72 is two-dimensionally scanned with the laser beam 71, and an output S representing a two-dimensional enlarged image of the sample 72 is generated by the photodetector 75. Also, with this scanning fluorescence microscope, the fluorescence 73 produced from the inside of the sample 72 is detected, and therefore an image of the inside of the sample 72 can be formed.

A sixth embodiment of the first confocal scanning microscope in accordance with the present invention, which is constituted as a reflection type fluorescence microscope, will be described hereinbelow with reference to FIG. 9. The major part of this scanning fluorescence microscope is constituted in the same manner as that in the third embodiment shown in FIG. 6. In this embodiment, like the fifth embodiment shown in FIG. 8, the Ar laser 70 is employed as the laser beam source.

Figure 9:
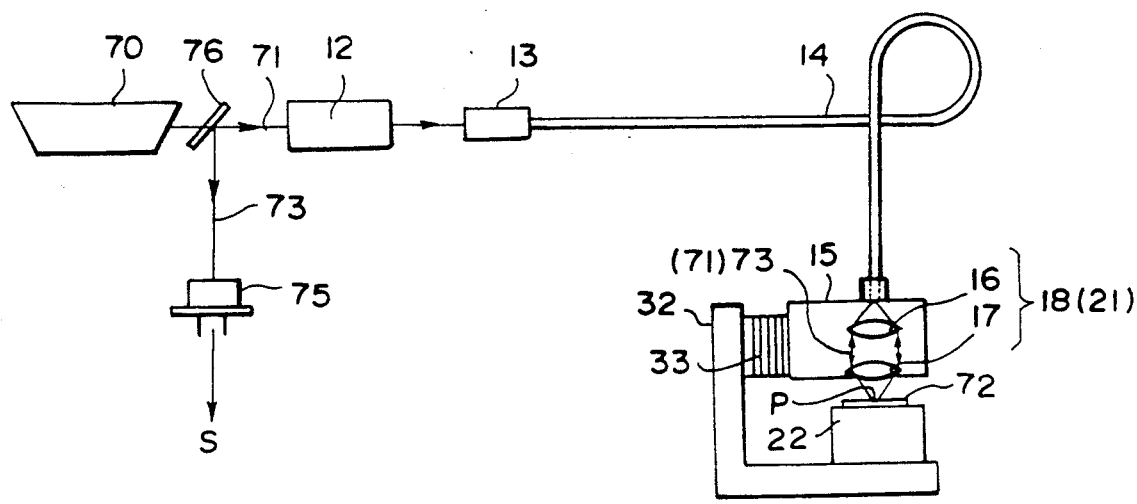

With reference to FIG. 9, a fluorescent probe has been injected into the living organism sample 72. When the sample 72 is exposed to the laser beam 71, it produces the fluorescence 73. The fluorescence 73 and the laser beam 71, which has been reflected by the sample 72, pass through the sample 72, are condensed by the light receiving optical means 21, and then enter the optical fiber 14. The fluorescence 73 and the laser beam 71 are guided through the optical fiber 14 and radiated out of the distributed index lens 13. A dichroic mirror 76 is located between the distributed index lens 13 and the Ar laser 70. The fluorescence 73 and the laser beam 71, which have been radiated out of the distributed index lens 13, impinge upon the dichroic mirror 76. The dichroic mirror 76 reflects only the fluorescence 73 and guides it to the photodetector 75. In this manner, the fluorescence 73 is detected by the photodetector 75.

A seventh embodiment of the first confocal scanning microscope in accordance with the present invention, which is constituted as a transmission type fluorescence microscope, will be described hereinbelow with reference to FIG. 10. The major part of this scanning fluorescence microscope is constituted in the same manner as that in the second embodiment shown in FIG. 5. In this embodiment, a laser diode 80 is employed as the laser beam source. The laser diode 80 produces a laser beam 71, which has wavelengths falling within the stimulation wavelength range of the fluorescent substance which is formed by the fluorescent probe injected into the living organism sample 72.

Figure 10:
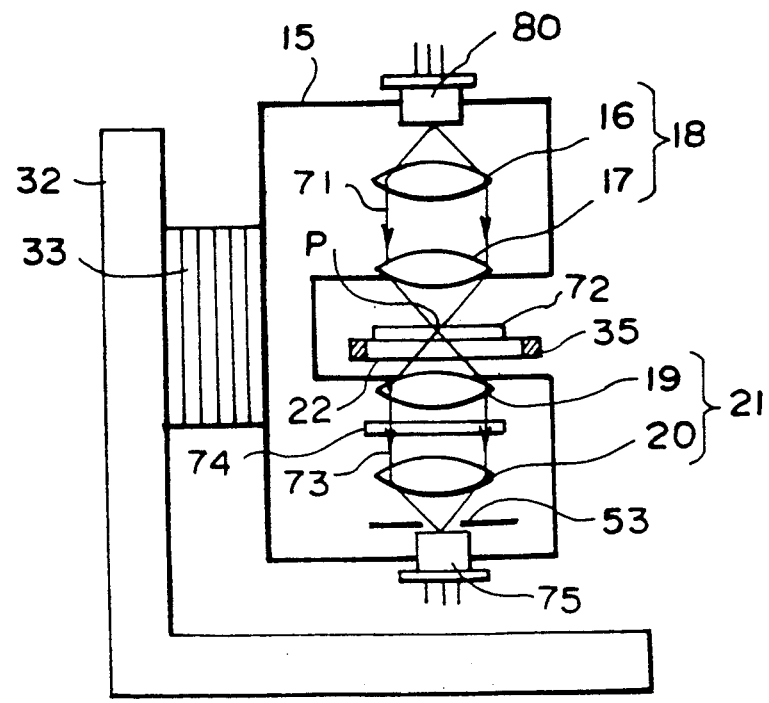

Also, in FIG. 10, the same interference filter 74 as that employed in the fifth embodiment of FIG. 8 is located in the light receiving optical means 21. Only the fluorescence 73 produced by the living organism sample 72 passes through the interference filter 74 and is detected by the photodetector 75.

Figure 11:
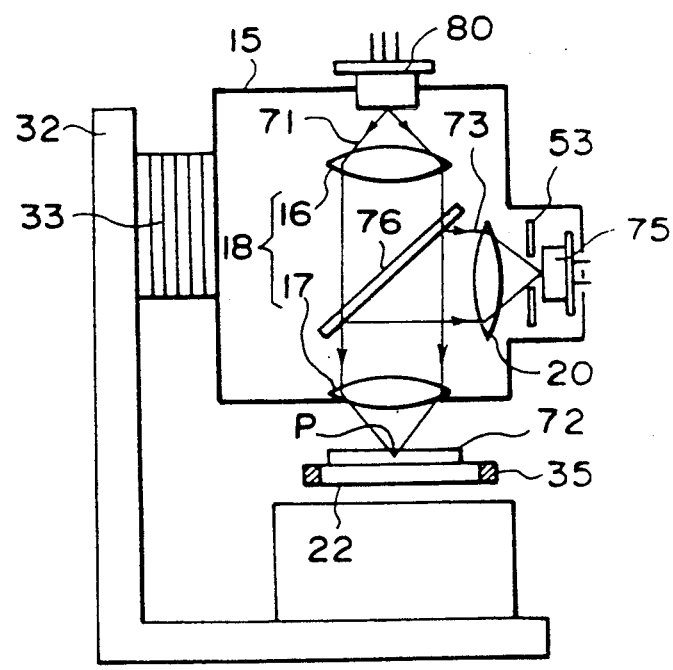

An eighth embodiment of the first confocal scanning microscope in accordance with the present invention, which is constituted as a reflection type fluorescence microscope, will be described hereinbelow with reference to FIG. 11. In this embodiment, the light projecting optical means 18, which is employed in the seventh embodiment shown in FIG. 10, also serves as the light receiving optical means 21 described above. Also, the same dichroic mirror 76 as that employed in the sixth embodiment of FIG. 9 is located in the optical means 18. The fluorescence 73, which has been produced by the living organism sample 72, is reflected by the dichroic mirror 76 and thereby separated from the laser beam 71. The fluorescence 73, which has been reflected by the dichroic mirror 76, passes through the condensing lens 20 and the aperture pinhole 53, and is detected by the photodetector 75.

A ninth embodiment of the first confocal scanning microscope in accordance with the present invention will be described hereinbelow with reference to FIG. 12. This confocal scanning microscope is of the transmission type and forms a color image. A red laser diode 90R, a green laser diode 90G, and a blue laser diode 90B are secured to the movable member 15, and produce a red laser beam 11R, a green laser beam 11G, and a blue laser beam 11B. The red laser beam 11R, the green laser beam 11G, and the blue laser beam 11B are respectively collimated by collimator lenses 16R, 16G, and 16B. The red laser beam 11R passes through dichroic mirrors 91 and 92. The green laser beam 11G is reflected by the dichroic mirror 91 and then passes through the dichroic mirror 92. The blue laser beam 11B is reflected by the dichroic mirror 92. In this manner, the red laser beam 11R, the green laser beam 11G, and the blue laser beam 11B are combined with one another, and combined laser beams 11 are obtained.

The combined laser beams 11 are condensed by the objective lens 17, and an image of a small light spot of the combined laser beams 11 is formed at the point P on or in the sample, which is placed on the sample supporting member 22. The combined laser beams 11', which have passed through the sample 23, are collimated by the objective lens 19.

The combined laser beams 11', which have been collimated by the objective lens 19, impinge upon the dichroic mirror 26. Only the blue laser beam 11B is reflected by the dichroic mirror 26. The blue laser beam 11B, which has been reflected by the dichroic mirror 26, is condensed by a condensing lens 20B, passes through an aperture pinhole 53B, and is then detected by the first photodetector 27. The combined laser beams 11', which have passed through the dichroic mirror 26, impinge upon the dichroic mirror 28. Only the green laser beam 11G is reflected by the dichroic mirror 28. The green laser beam 11G, which has been reflected by the dichroic mirror 28, is condensed by a condensing lens 20G, passes through an aperture pinhole 53G, and is then detected by the second photodetector 29. Of the combined laser beams 11', only the red laser beam 11R passes through the dichroic mirror 28. The red laser beam 11R, which has passed through the dichroic mirror 28, is condensed by a condensing lens 20R, passes through an aperture pinhole 53R, and is then detected by the third photodetector 31.

The photodetectors 27, 29, and 31 are constituted of photodiodes, or the like, and generate signals SB, SG, and SR, which represent the blue components, the green components, and the red components of an enlarged image of the sample 23. In this embodiment, by way of example, the same scanning mechanism as that employed in the first embodiment of FIG. 1 may be employed.

A tenth embodiment of the first confocal scanning microscope in accordance with the present invention will b described hereinbelow with reference to FIG. 13. This confocal scanning microscope is of the reflection type and forms a color image. In this embodiment, the red laser diode 90R, the green laser diode 90G, and the blue laser diode 90B are secured to the movable member 15.

Figure 12:
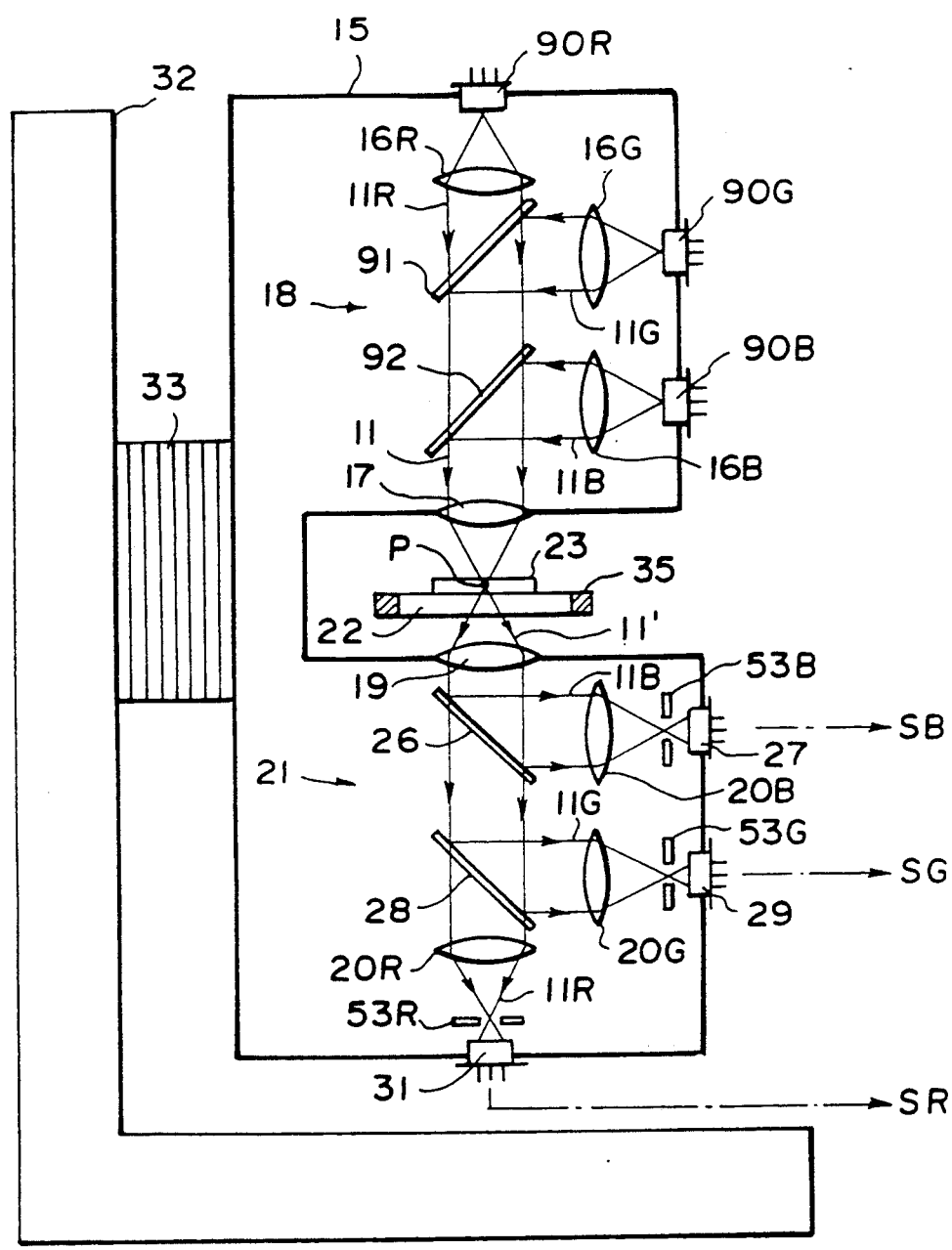

Also, the light projecting optical means 18 is constituted basically in the same manner as that in the ninth embodiment of FIG. 12. In this embodiment, a beam splitter 61 is located between the dichroic mirror 92 and the objective lens 17. The combined laser beams 11 pass through the beam splitter 61.

The combined laser beams 11", which have been reflected by the sample 23, are collimated by the objective lens 17 and then reflected by the beam splitter 61 to the light receiving optical means 21. The light receiving optical means 21 is constituted in the same manner as that in the ninth embodiment of FIG. 12.

In this embodiment, the photodetectors 27, 29, and 31 generate the signals SB, SG, and SR, which represent the blue components, the green components, and the red components of an enlarged image of the sample 23.

Figure 14:
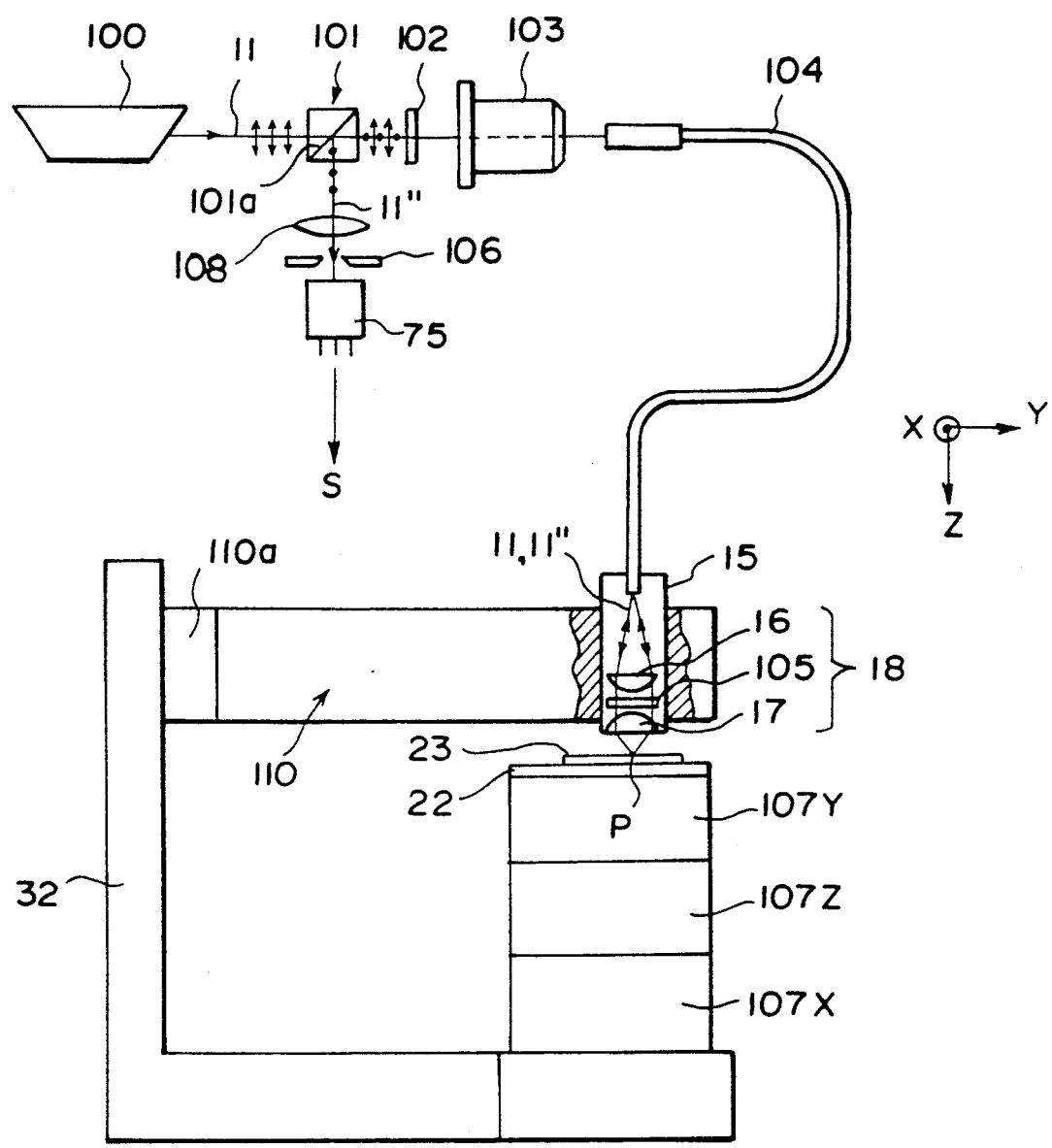
Figure 15:
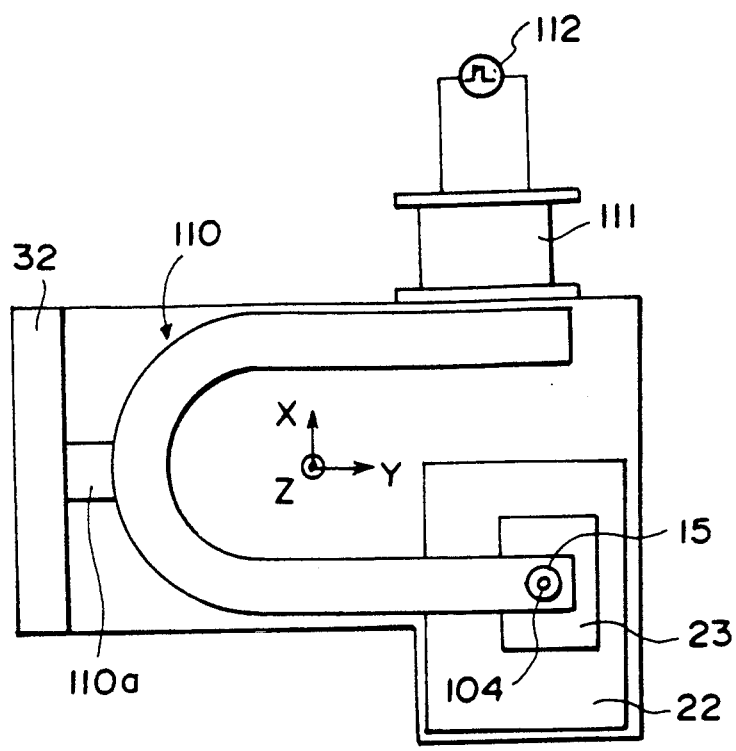
FIG. 15 is a plan view showing a scanning mechanism employed in the eleventh embodiment of the first confocal scanning microscope in accordance with the present invention.

An eleventh embodiment of the first confocal scanning microscope in accordance with the present invention will be described hereinbelow with reference to FIG. 14. This confocal scanning microscope is of the monochromatic reflection type. FIG. 15 is a plan view showing the scanning mechanism employed in this embodiment. A monochromatic light laser 100 produces a laser beam 11 having a single wavelength. The linear polarized laser beam 11 impinges in the P-polarized condition upon a film surface 101a of a polarization beam splitter 101 and passes therethrough. The laser beam 11, which has passed through the polarization beam splitter 101, then passes through a halfwave plate 102 for adjusting the plane of polarization. The laser beam 11, which has passed through the halfwave plate 102, is condensed by an entry lens 103 and enters a polarization plane keeping optical fiber 104.

Figure 16:
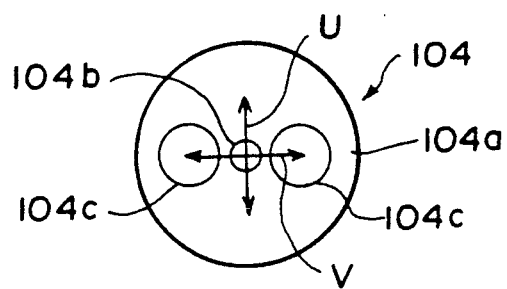
FIG. 16 is a sectional view showing a polarization plane keeping optical fiber employed in the eleventh embodiment of the first confocal scanning microscope in accordance with the present invention.

As the polarization plane keeping optical fiber 104, a PANDA type optical fiber may be employed. FIG. 16 shows the cross-sectional configuration of the PANDA type optical fiber 104. As illustrated in FIG. 16, the optical fiber 104 is composed of a cladding part 104a and a core 104b which is located in the cladding part 104a. Stress imparting parts 104c, 104c are formed on both sides of the core 104b. The halfwave plate 102 is rotated appropriately such that the orientation of the plane of polarization of the linear polarized laser beam 11 coincides with the directions indicated by the double headed arrow V in FIG. 16, along which the stress imparting parts 104c, 104c stand in a line, or the directions indicated by the double headed arrow U in FIG. 16, which directions are normal to the directions indicated by the double headed arrow V. (In this embodiment, the halfwave plate 102 is rotated appropriately such that the orientation of the plane of polarization of the linear polarized laser beam 11 coincides with the directions indicated by the double headed arrow U in FIG. 16. In this manner, the linear polarized laser beam 11 is caused to impinge upon the optical fiber 104.

One edge of the optical fiber 104 is secured to the movable member 15. The laser beam 11, which has been guided through the optical fiber 104, is radiated out of said edge of the optical fiber 104. At this time, said edge of the optical fiber 104 radiates the laser beam 11 like a point light source. The light projecting optical means 18, which is composed of the collimator lens 16 and the objective lens 17, is secured to the movable member 15. (The light projecting optical means 18 also serves as a light receiving optical means.) A quarter-wave plate 105 is located between the collimator lens 16 and the objective lens 17.

The laser beam 11, which has been radiated out of the aforesaid edge of the optical fiber 104, is collimated by the collimator lens 16. The collimated laser beam 11 then passes through the quarter-wave plate 105 and is converted thereby into a circularly polarized laser beam. The collimated laser beam 11 is then condensed by the objective lens 17, and an image of a small light spot of the condensed laser beam 11 is formed at the point P on the sample 23 (i.e. on the surface of the sample 23 or in the inside of the sample 23). The sample 23 is placed on the sample supporting member 22. The laser beam 11 is reflected by the sample 23. At this time, the direction of rotation of the circularly polarized laser beam 11 is reversed. The laser beam 11", which has thus been reflected by the sample 23, passes through the quarter-wave plate 105 and is converted thereby into a linear polarized laser beam 11" having the plane of polarization, which is oriented in the direction normal to the orientation of the plane of polarization of the laser beam 11. Thereafter, the laser beam 11" is condensed by the collimator lens 16 and impinges upon the polarization plane keeping optical fiber 104. At this time, the orientation of the plane of polarization of the laser beam 11" coincides with the directions indicated by the double headed arrow V in FIG. 16. The laser beam 11", which has been guided through the optical fiber 104, is radiated out of the edge of the optical fiber 104 and collimated by the entry lens 103.

Thereafter, the laser beam 11", which has thus been collimated by the entry lens 103, passes through the halfwave plate 102, impinges upon the film surface 101a of the polarization beam splitter 101 in the S-polarized condition, and is reflected by the film surface 101a. The laser beam 11", which has thus been reflected by the film surface 101a, is condensed by a condensing lens 108, passes through an aperture pinhole 106, and is detected by the photodetector 75. The photodetector 75 generates a signal S representing an enlarged image of the sample 23.

As described above, a light isolator is provided which is composed of the quarter-wave plate 105 and the polarization beam splitter 101. Therefore, the laser beam 11" does not return to the laser 100, and a large amount of the laser beam 11" can be guided to the photodetector 75. Also, the laser beam 11, which is reflected by the entry lens 103, the edge surface of the optical fiber 104, or the like, is prevented from impinging upon the photodetector 75. Therefore, a signal S having a high S/N ratio can be obtained.

How the sample 23 is two-dimensionally scanned with the light spot of the laser beam 11, which is formed at the point P, will be described hereinbelow with reference to FIGS. 14 and 15. The movable member 15 is secured to one edge part of a tuning fork 110, which is placed horizontally, such that the optical axis of the optical means 18 extends vertically. A base part 110a of the tuning fork 110 is secured to the frame 32, and the tuning fork 110 can vibrate at a predetermined intrinsic frequency. An electromagnet 111 is located on the side outward from the other edge part of the tuning fork 110 in a slightly spaced relation thereto.

A pulsed electric power source 112 applies a square-pulsed current having a frequency, which is equal to the intrinsic frequency of the tuning fork 110, to the electromagnet 111. In this manner, a pulsed magnetic field acts on the other edge part of the tuning fork 110. Therefore, the tuning fork 110 vibrates at its intrinsic frequency. As a result, the movable member 15 secured to the tuning fork 110 is reciprocally moved at high speeds in the directions indicated by the arrow X in FIGS. 14 and 15 (i.e. horizontally). In this manner, the sample 23 is scanned with the light spot in the main scanning directions.

Also, an X movable stage 107X, which is capable of reciprocally moving in the directions indicated by the 107Z, which is capable of reciprocally moving in the directions indicated by the arrow Z (i.e. along the optical axis of the optical means 18), is located on the X movable stage 107X. Also, a Y movable stage 107Y, which is capable of reciprocally moving in the directions indicated by the arrow Y (which directions are normal to the directions indicated by the arrows X and Z), is located on the Z movable stage 107Z. The sample supporting member 22 is mounted on the Y movable stage 107Y. When the main scanning with the light spot formed at the point P is carried out in the manner described above, the Y movable stage 107Y is moved reciprocally.; In this manner, the sub-arrow scanning with the light spot formed at the point P can be effected.

Before the two-dimensional scanning with the light spot formed at the point P is carried out, the X movable stage 107X, the Y movable stage 107Y, and the Z movable stage 107Z may be moved appropriately. In this manner, adjustment of the position of the sample 23 with respect to the optical means 18 (finding of the visual field and the focus adjustment) can be carried out.

Also, each time the two-dimensional scanning with the light spot formed at the point P is carried out, the Z movable stage 107Z is moved appropriately. In this manner, a signal S can be obtained which represent the image information at every focusing plane within the range of movement of the sample 23 along the directions indicated by the arrow Z.

Embodiments of the third scanning microscope in accordance with the present invention will be described hereinbelow with reference to FIGS. 17 through 27.

Figure 17:
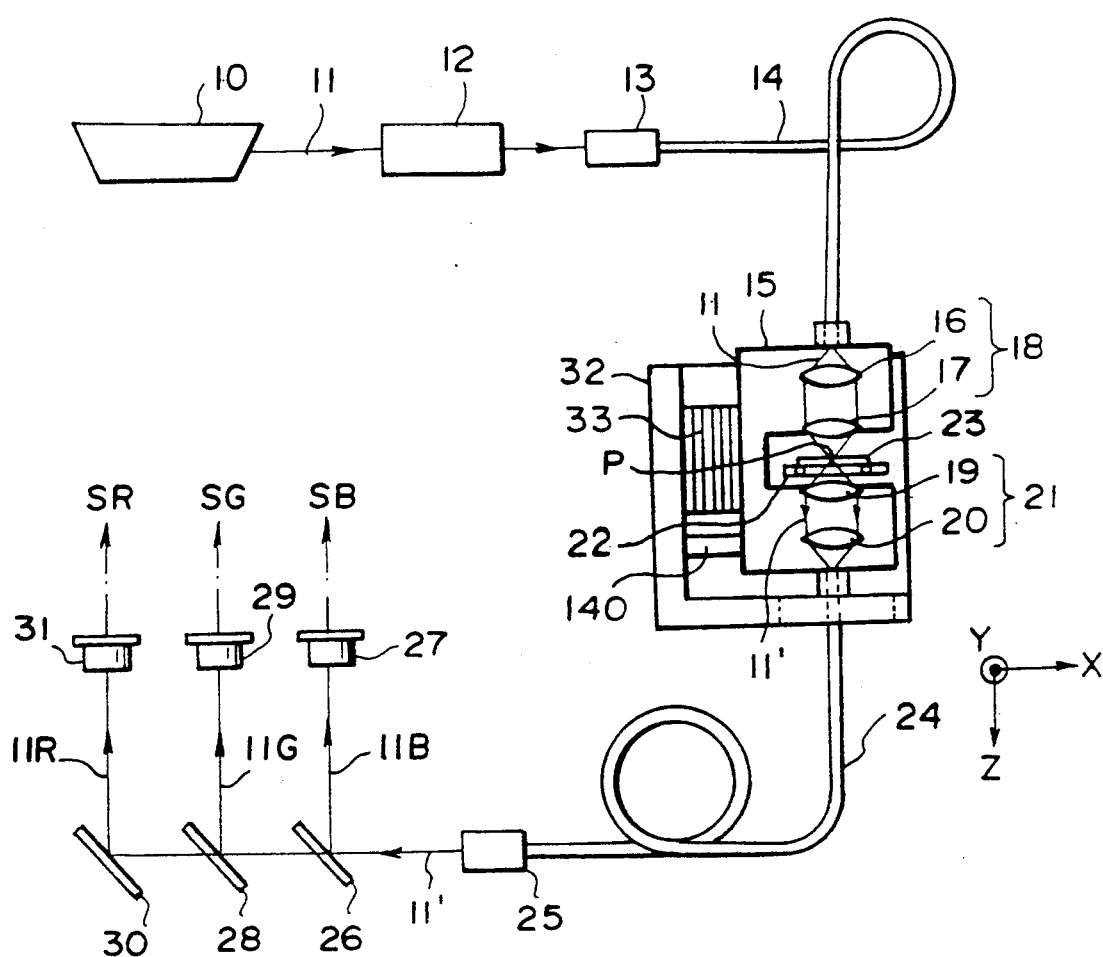
FIG. 17 is a front view showing a first embodiment of the third scanning microscope in accordance with the present invention.
Figure 18:
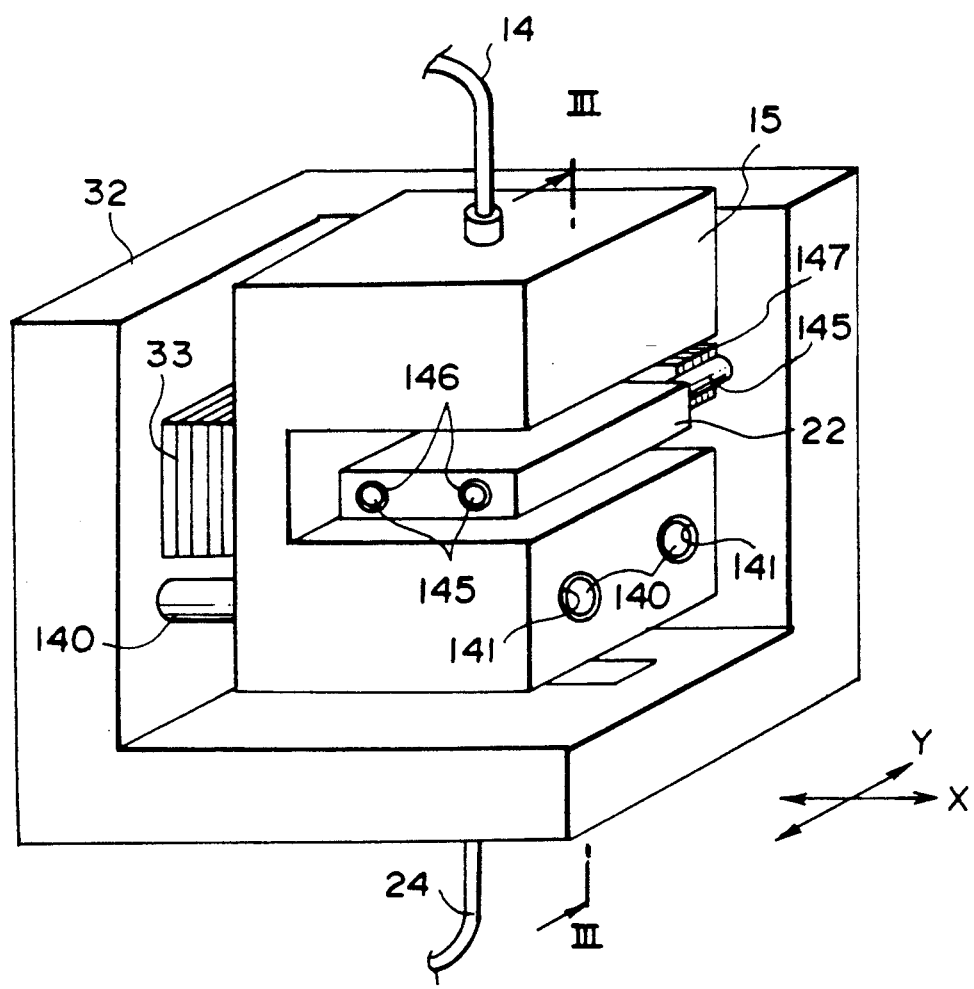
FIG. 18 is a perspective view showing the major part of the embodiment shown in FIG. 17.

FIG. 17 shows a first embodiment of the third scanning microscope in accordance with the present invention, which is constituted as a transmission type confocal scanning microscope. FIG. 18 shows a scanning mechanism employed in this embodiment. In FIGS. 17 and 18, similar elements are numbered with the same reference numerals with respect to FIG. 1.

How the sample 23 is two-dimensionally scanned with the light spot of the laser beam 11, which is formed at the point P, will be described hereinbelow with reference to FIG. 18. The movable member 15 is supported on the frame 32 such that it can move in the directions indicated by the double headed arrow X. Specifically, edges of hollow guide pipes 140, 140, each of which is closed at both edges, are secured to the frame 32. The guide pipes 140, 140 are loosely fitted in guide holes 141, 141, which are formed through the movable member 15.

Figure 19:
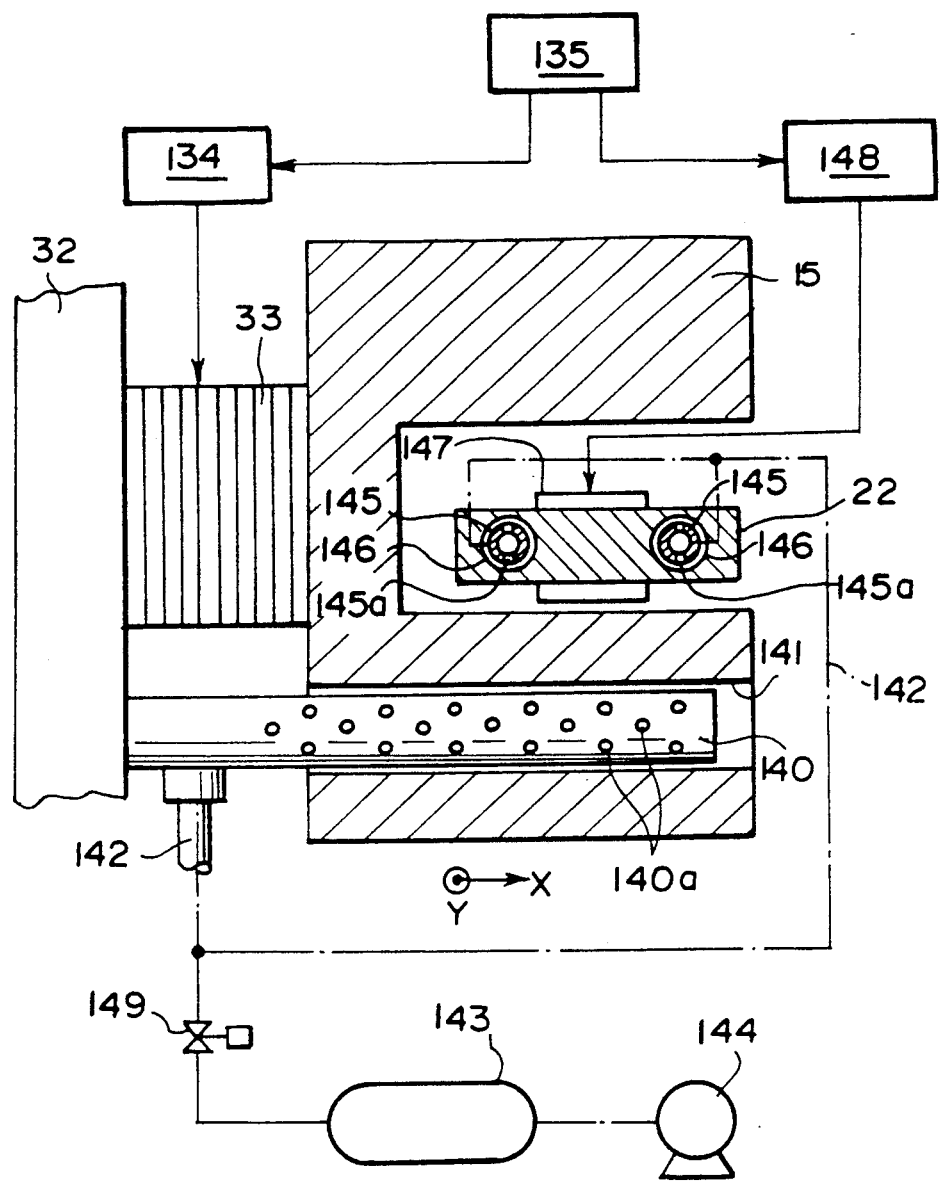
FIG. 19 is a partially cutaway schematic front view showing the major part of the embodiment shown in FIG. 17.

FIG. 19 is a vertical sectional view taken along line III-III of FIG. 18. As illustrated in FIG. 19, a plurality of air outlets 140a, 140a, . . . are perforated through the wall of each guide pipe 140, which wall faces the inner surface of the corresponding guide hole 141. The space inside of each guide pipe 140 communicates with an air chamber 143 via a compressed air feed pipe 142. A solenoid valve 149 is located in the compressed air feed pipe 142. An air compressor 144 supplies compressed air to the air chamber 143.

The laminated piezo-electric device 33 is located between the movable member 15 and the frame 32. The laminated piezo-electric device 33 receives operating electric power from a piezo-electric device operating circuit 134 and reciprocally moves the movable member 15 at high speeds in the main scanning directions indicated by the double headed arrow X. By way of example, the frequency of the reciprocal movement is set as being 10 kHz. In such cases, if the main scanning width is equal to 100 μm, the main scanning speed will be equal to $$10 \times 10^3 \times 100 \times 10^{-6} \times 2 = 2 m/s$$

The optical fibers 14 and 24 are flexible and allow the movable member 15 to move while the laser beam 11 and the laser beam 11' are guided therethrough.

The sample supporting member 22 is supported on the frame 32 such that it can move in the directions indicated by the double headed arrow Y, which directions are normal to the directions indicated by the double headed arrow X. Specifically, edges of guide pipes 145, 145, which are of the same type as the guide pipes 140, 140, are secured to the frame 32. The guide pipes 145, 145 are loosely fitted in guide holes 146, 146, which are formed through the sample supporting member 22. As illustrated in FIG. 19, like the guide pipes 140, 140, a plurality of air outlets 145a, 145a, . . . are perforated through the wall of each guide pipe 145, which wall faces the inner surface of the corresponding guide hole 146. The guide pipes 145, 145 are connected to the compressed air feed pipe 142.

A laminated piezo-electric device 147 is located between the sample supporting member 22 and the frame 32. The laminated piezo-electric device 147 receives operating electric power from a piezo-electric device operating circuit 148 and reciprocally moves the sample supporting member 22 at high speeds in the sub-scanning directions indicated by the double headed arrow Y. In this manner, the sample supporting member 22 is moved with respect to the movable member 15, and the sample 23 is scanned with the light spot, which is formed at the point P, in the sub-scanning directions indicated by the double headed arrow Y. The sub-scanning directions are normal to the main scanning directions indicated by the double headed arrow X. By way of example, the time required for the sub-scanning is set as being 1/20 second. In such cases, if the sub-scanning width is equal to 100 μm, the sub-scanning speed will be equal to $$20 \times 100 \times 10^{-6} = 0.002 m/s = 2mm/s$$

Specifically, the sub-scanning speed is sufficiently lower than the main scanning speed. When the sub-scanning speed is as low as this level, the sample 23 does not fly out of its correct position when the sample supporting member 22 is moved.

In the manner described above, the sample 23 is two-dimensionally scanned with a light spot formed at the point P. As a result, the time-serial signals SB, SG, and SR representing the two-dimensional image of the sample 23 are obtained. By way of example, the signals SB, SG, and SR are sampled with a predetermined period, and signals divided into picture elements are obtained.

When the two-dimensional scanning with the light spot formed at the point P is carried out, the solenoid valve 149 is opened, and compressed air is fed into the guide pipes 140, 140 and the guide pipes 145, 145. The compressed air jets out of the air outlets 140a, 140a, . . . and the air outlets 145a, 145a, . . . . In this manner, jet air layers are formed between the guide pipes 140, 140 and the guide holes 141, 141 and between the guide pipes 145, 145 and the guide holes 146, 146. Therefore, the movable member 15 reciprocally moves while it is not in contact with the guide pipes 140, 140. Also, the sample supporting member 22 reciprocally moves while it is not in contact with the guide pipes 145, 145. Accordingly, when the movable member 15 and the sample supporting member 22 move, the frictional resistance thereof can be kept markedly small. Also, the load to the laminated piezo-electric devices 33 and 147 can be kept markedly small. As a result, the laminated piezo-electric devices 33 and 147 can vibrate quickly, and the scanning with the light spot formed at the point P can be carried out quickly.

A control circuit 135 feeds synchronizing signals to the piezo-electric device operating circuits 134 and 148. The synchronizing signals synchronize the scanning with the light spot, which is formed at the point P, in the main and sub-scanning directions.

In this embodiment, though not illustrated, the sample supporting member 22 can also be moved in the directions indicated by the arrow Z in FIG. 17 (i.e. along the optical a is of the light projecting optical means 18 and the light receiving optical means 21), which directions are normal to the main scanning directions indicated by the arrow X and the sub-scanning directions indicated by the arrow Y. The two-dimensional scanning with the light spot formed at the point P is carried out each time the sample supporting member 22 is moved a predetermined distance along the directions indicated b the arrow Z. In this manner, only the information at the focusing plane can be detected by the photodetectors 27, 29, and 31. The signals SB, SG, and SR generated by the photodetectors 27, 29, and 31 may be stored on a frame memory. In this manner, signals can be obtained which represent the image information at every focusing plane within the range of movement of the sample 23 along the directions indicated by the arrow Z.

The embodiment described above may be modified in various ways. For example, instead of the sub-scanning with the light spot, which is formed at the point P, being carried out by the movement of the sample supporting member 22, the sub-scanning with the light spot may be effected by moving the movable member 15. Additionally, instead of the laminated piezo-electric devices 33 and 147 being used to move the movable member 15 and the sample supporting member 22, a scanning technique utilizing a voice coil and natural oscillation of a solid with ultrasonic waves, or the like, may be utilized to move the movable member 15 and the sample supporting member 22.

Further embodiments of the third scanning microscope in accordance with the present invention will be described hereinbelow. In the drawings described below similar elements are numbered with the same reference numerals with respect to FIG. 17, 18, or 19. Only the scanning mechanisms for scanning with the light spot will be described below.

Figure 20:
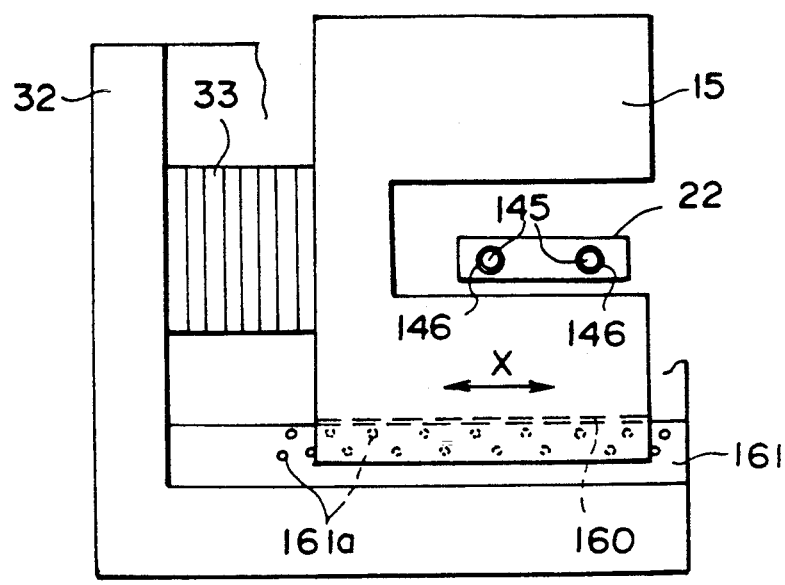
FIG. 20 is a front view showing the major part of a second embodiment of the third scanning microscope in accordance with the present invention.
Figure 21:
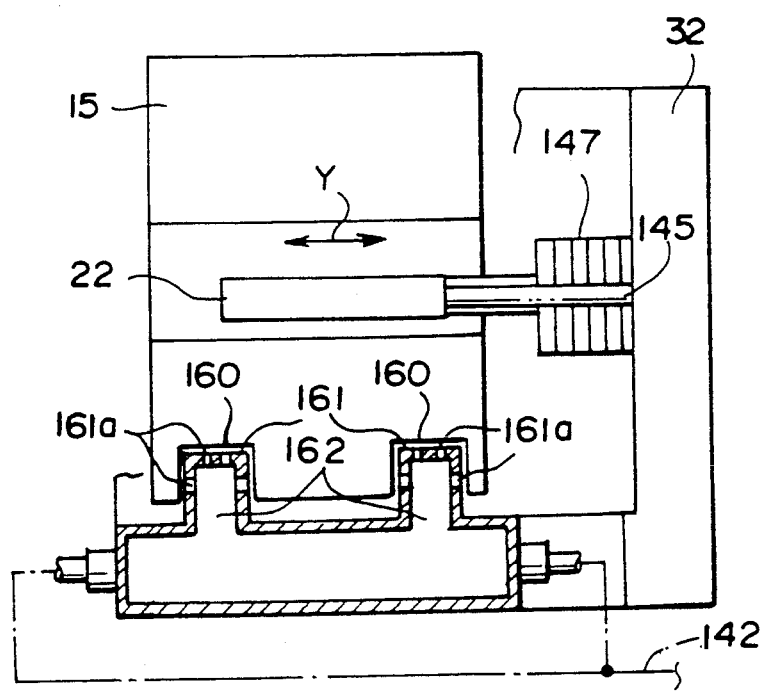
FIG. 21 is partially cutaway side view showing the major part of the second embodiment of the third scanning microscope in accordance with the present invention.

FIGS. 20 and 21 show a second embodiment of the third scanning microscope in accordance with the present invention. In this embodiment, guide grooves 160, 160 are formed in the bottom surface of the movable member 15. Also, the frame 32 is provided with guide rails 161, 161, which are fitted in the guide grooves 160, 160 such that the movable member 15 can move in the directions indicated by the double headed arrow X. The guide rails 161, 161 have internal spaces 162, 162, which communicate with the compressed air feed pipe 142. A plurality of air outlets 161a, 161a, . . . are perforated through the wall of each of the guide rails 161, 161.

When the movable member 15 is moved during the main scanning with the light spot, compressed air is fed from the compressed air feed pipe 142 to the internal spaces 162, 162 of the guide rails 161, 161. The compressed air jets out of the air outlets 161a, 161a, . . . of the rails 161, 161. Therefore, the same effects of reducing the frictional resistance as that described above can be obtained.

Figure 22:
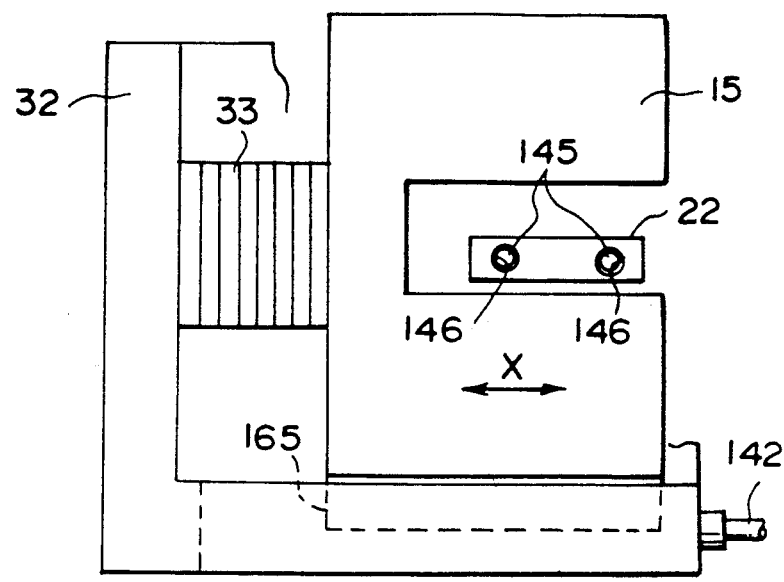
FIG. 22 is a front view showing the major part of a third embodiment of the third scanning microscope in accordance with the present invention.
Figure 23:
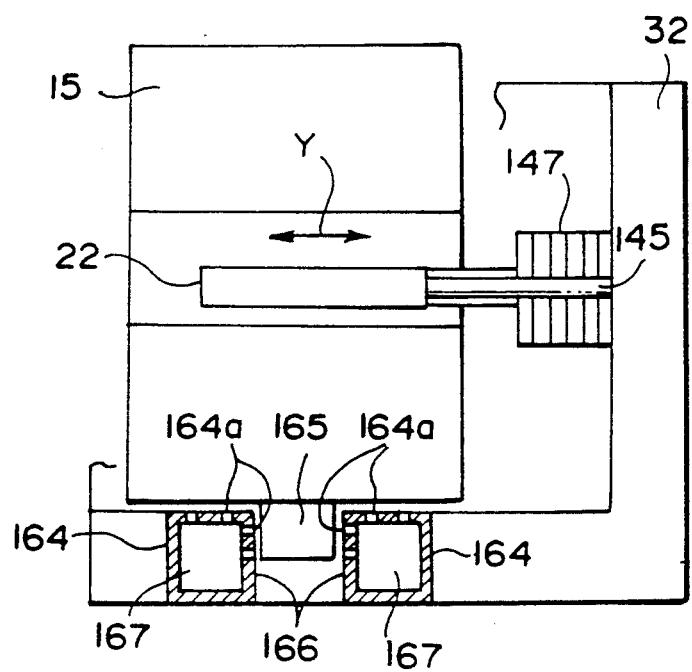
FIG. 23 is partially cutaway side view showing the major part of the third embodiment of the third scanning microscope in accordance with the present invention.

A third embodiment of the third scanning microscope in accordance with the present invention will be described hereinbelow with reference to FIGS. 22 and 23. In this embodiment, a guide rail 165 is formed on the bottom surface of the movable member 15. Also, the frame 32 is provided with guide blocks 164, 164, which define a guide groove 166 therebetween. The guide rail 165 is loosely fitted in the guide groove 166 such that the movable member 15 can move in the directions indicated by the double headed arrow X. Hollow regions 167, 167 are formed in the parts of the guide blocks 164, 164, which parts correspond to the guide groove 166. The hollow regions 167, 167 communicate with the compressed air feed pipe 142. Also, a plurality of air outlets 164a, 164a, . . . , which communicate with each hollow region 167, are perforated through the walls of each guide block 164, which face the bottom surface of the movable member 15 and the side surfaces of the guide rail 165 located in the guide groove 166.

When the movable member 15 is moved during the main scanning with the light spot, compressed air is fed from the compressed air feed pipe 142 to the hollow regions 167, 167 in the guide blocks 164, 164. The compressed air jets out of the air outlets 164a, 164a, . . . of the guide blocks 164, 164. Therefore, the same effects of reducing the frictional resistance as that described above can be obtained.

Figure 24:
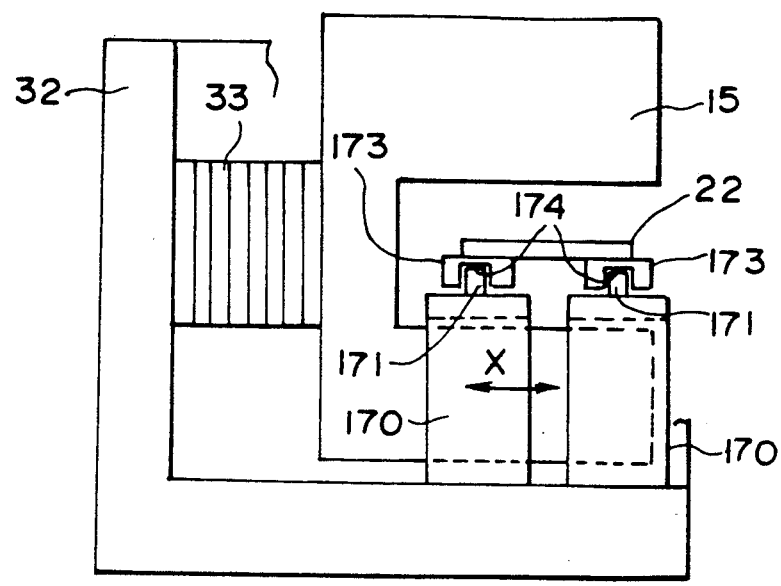
FIG. 24 is a front view showing the major part of a fourth embodiment of the third scanning microscope in accordance with the present invention.
Figure 25:
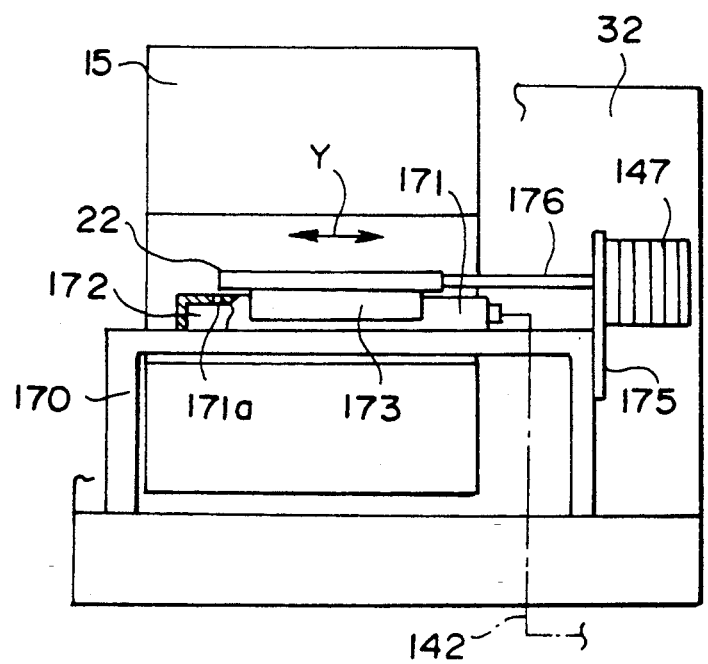
FIG. 25 is partially cutaway side view showing the major part of the fourth embodiment of the third scanning microscope in accordance with the present invention.

A fourth embodiment of the third scanning microscope in accordance with the present invention will be described hereinbelow with reference to FIGS. 24 and 25. In this embodiment, guide rail supports 170, 170 extending in the sub-scanning directions indicated by the double headed arrow Y are secured to the frame 32. Guide rails 171, 171 are secured to the top surfaces of the guide rail supports 170, 170. Like the guide rails 161, 161 shown in FIGS. 20 and 21, the guide rails 171, 171 have internal spaces 172, 172, which communicate with the compressed air feed pipe 142. A plurality of air outlets 171a, 171a, . . . are perforated through the wall of each guide rail 171.

Also, guide blocks 173, 173 are secured to the bottom surface of the sample supporting member 22. The guide blocks 173, 173 are provided with guide grooves 174, 174. The guide rails 171, 171 are fitted in the guide grooves 174, 174 such that the sample supporting member 22 can move in the sub-scanning directions indicated by the double headed arrow Y. In this embodiment, the laminated piezo-electric device 147 is secured to a bracket 175, which is mounted on the guide rail supports 170, 170. The laminated piezo-electric device 147 is coupled with the sample supporting member 22 by a coupling member 176 and reciprocally moves the sample supporting member 22.

When the sample supporting member 22 is moved during the sub-scanning with the light spot, compressed air is fed from the compressed air feed pipe 142 to the internal spaces 172, 172 of the guide rails 171, 171. The compressed air jets out of the air outlets 171a, 171a, . . . of the guide rails 171, 171. Therefore, the same effects of reducing the frictional resistance as that described above can be obtained.

Figure 26:
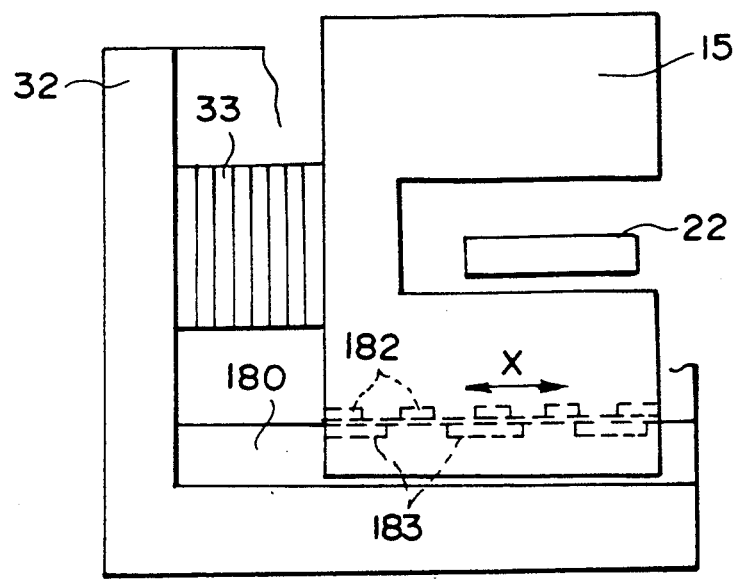
FIG. 26 is a front view showing the major part of a fifth embodiment of the third scanning microscope in accordance with the present invention.
Figure 27:
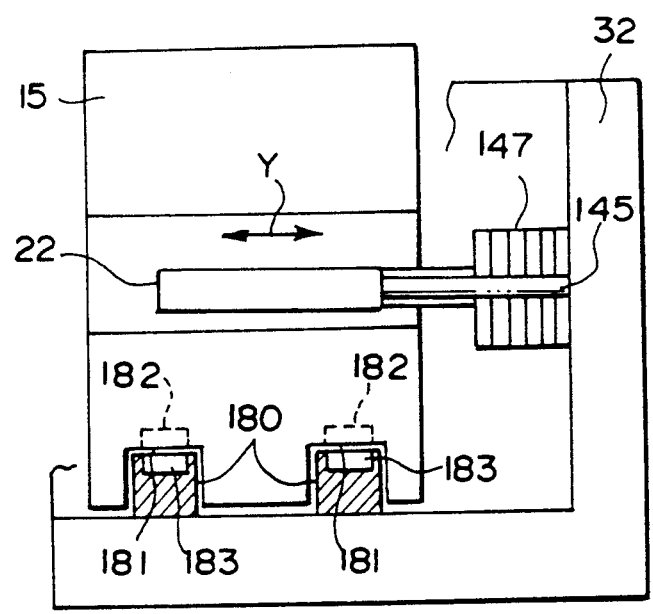
FIG. 27 is partially cutaway side view showing the major part of the fifth embodiment of the third scanning microscope in accordance with the present invention.

A fifth embodiment of the third scanning microscope in accordance with the present invention will be described hereinbelow with reference to FIGS. 26 and 27. In this embodiment, the frame 32 is provided with guide rails 180, 180 extending in the main scanning directions indicated by the double headed arrow X. Also, guide grooves 181, 181 are formed in the bottom surface of the movable member 15. The guide rails 180, 180 are fitted in the guide grooves 181, 181 such that the movable member 15 can move in the main scanning directions. A runner 182 and stators 183, 183, which constitutes a linear motor, are mounted respectively on the movable member 15 and the guide rails 180, 180.

In this embodiment, the reciprocal movement of the movable member 15 during the main scanning is carried out by operating the linear motor. At this time, the movable member 15 is floated by the magnetic force away from the guide rails 180, 180. Therefore, the frictional resistance of the movable member 15 with respect to the guide rails 180, 180 can be kept small, and the movable member 15 can be reciprocally moved at high speeds.

The linear motor described above can be utilized also for the reciprocal movement of the sample supporting member 22. Alternatively, instead of the linear motor being used as the operation source for the main scanning or the sub-scanning, a means may be utilized which floats the movable member 15 or the sample supporting member 22 through magnetic repulsion. In such cases, the frictional resistance of the movable member 15 or the sample supporting member 22 during the reciprocal movement can be kept small, and quick scanning can be achieved.

The aforesaid embodiments of the third scanning microscope in accordance with the present invention are applied to the transmission type confocal scanning microscope. The third scanning microscope in accordance with the present invention can also be embodied as a reflection type confocal scanning microscope or as a scanning microscope other than the confocal scanning microscope.

Also, the scanning mechanisms employed in the aforesaid embodiments of the first confocal scanning microscope and the third scanning microscope in accordance with the present invention are also applicable when the scanning is to be carried out in apparatuses other than microscopes. For example, the scanning mechanisms described above may be employed when the scanning is to be carried out during the writing of information in memories, the reading of information from memories, and the detection of video or audio signals from recording media.

We claim:

1. A confocal scanning microscope comprising:
   i) a sample supporting member on which a sample is supported,
   ii) a light source which produces a light beam,
   iii) a light projecting optical means with which an image of said light beam is formed as a small light spot on said sample,
   light beam radiated out of said sample is condensed, and an image of the condensed light beam is formed as a point image,
   v) a photodetector which detects said point image,
   vi) a movable member which supports said light projecting optical mean and said light receiving optical means together,
   vii) a main scanning means which reciprocally moves said movable member such that said light spot scans said sample in main scanning directions, and
   viii) a sub-scanning means which moves said sample supporting member with respect to said movable member in sub-scanning directions, which are approximately normal to said main scanning directions, and at a speed lower than the speed at which said light spot scans said sample in said main scanning directions, whereby said sample is scanned with said light spot in said sub-scanning directions.

2. A confocal scanning microscope as defined in claim 1 wherein said movable member also supports said light source and said photodetector.

3. A confocal scanning microscope as defined in claim 1 wherein said confocal scanning microscope is of a reflection type, and said light projecting optical means also serves as said light receiving optical means.

4. A confocal scanning microscope as defined in claim 1 wherein a means is provided which reciprocally moves said sample supporting member in directions, which are normal to said main scanning directions and said sub-scanning directions.

5. A confocal scanning microscope as defined in claim 1 wherein said light source is a laser.

6. A confocal scanning microscope comprising:
   i) a sample supporting member on which a sample is supported,
   ii) a light source which produces a light beam,
   iii) a light projecting optical means with which an image of said light beam is formed as a small light spot on said sample,
   iv) a light receiving optical means with which the light beam radiated out of said sample is condensed, and an image of the condensed light beam is formed as a point image,
   v) a photodetector which detects said point image,
   vi) a scanning means which moves said light projecting optical means and said light receiving optical means in synchronization with each other with respect to said sample supporting member such that said light spot scans said sample in main scanning directions and sub-scanning directions, and
   vii) an optical fiber having a first edge surface, on which an image of the light beam coming from said light receiving optical means is formed, and a second edge surface from which the light beam, which has entered said optical fiber from said first edge surface, is radiated to said photodetector,
   wherein a pinhole is formed in a core part at said first edge surface of said optical fiber, and the image of the light beam coming from said light receiving optical means is formed at the position at which said pinhole is formed.

7. A confocal scanning microscope as defined in claim 6 wherein a means is provided which reciprocally moves said sample supporting member in directions, which are normal to said main scanning directions and said sub-scanning directions.

8. A confocal scanning microscope as defined in claim 6 wherein said light source is a laser.

9. A scanning microscope comprising:
   i) a sample supporting member on which a sample is supported,
   ii) an optical means which irradiates a light beam to said sample, and
   iii) a scanning means which moves said optical means with respect to said sample supporting member such that said light beam scans said sample,
   wherein the improvement comprises the provision of a mechanism for keeping a member, which is moved during said scanning, and a guide member, which supports and guides said member, such that they are not in contact with each other.

10. A scanning microscope as defined in claim 9 wherein said mechanism for keeping said member, which is moved during the scanning, and said guide member such that they are not in contact with each other jets a gas to the region between them.

11. A scanning microscope as defined in claim 9 wherein said mechanism for keeping said member, which is moved during the scanning, and said guide member such that they are not in contact with each other causes them to repulse each other by magnetic force.

12. A scanning microscope as defined in claim 9 wherein said light beam is a laser beam.

13. A confocal scanning mechanism comprising:
   i) a material supporting member on which a material to be scanned is supported,
   ii) a light source which produces a light beam, iii) a light projecting optical means with which an image of said light beam is formed as a small light spot on said material to be scanned,
iv) a light receiving optical means with which the light beam radiated out of said material to be scanned is condensed, and an image of the condensed light beam is formed as a point image,
v) a photodetector which detects said point image,
vi) a movable member which supports said light projecting optical means and said light receiving optical means together,
vii) a main scanning means which reciprocally moves said movable member such that said light spot scans said material, which is to be scanned, in main scanning directions, and
viii) a sub-scanning means which moves said material supporting member with respect to said movable member in sub-scanning directions, which are approximately normal to said main scanning directions, whereby said material to be scanned is scanned with said light spot in said sub-scanning directions.

14. A confocal scanning mechanism as defined in claim 13 wherein said movable member also supports said light source and said photodetector.

15. A confocal scanning mechanism as defined in claim 13 wherein said light projecting optical means also serves as said light receiving optical means.

16. A confocal scanning mechanism as defined in claim 13 wherein in a means is provided which reciprocally moves said material supporting member in directions, which are normal to said main scanning directions and said sub scanning directions.

17. A confocal scanning mechanism as defined in claim 13 wherein said light source is a laser.

18. A scanning mechanism comprising:
   i) a material supporting member on which a material to be scanned is supported,
   ii) an optical means which irradiates a light beam to said material to be scanned, and
   iii) a scanning means which moves said optical means with respect to said material supporting member such that said light beam scans said material to be scanned,
wherein the improvement comprises the provision of a mechanism for keeping a member, which is moved during said scanning, and a guide member, which supports and guides said member, such that they are not in contact with each other.

19. A scanning mechanism as defined in claim 18 wherein said mechanism for keeping said member, which is moved during the scanning, and said guide member such that they are not in contact with each other jets a gas to the region between them.

20. A scanning mechanism as defined in claim 18 wherein said mechanism for keeping said member, which is moved during the scanning, and said guide member such that they are not in contact with each other causes them to repulse each other by magnetic force.

21. A scanning mechanism as defined in claim 18 wherein said light beam is a laser beam.

* * * * *